(12) United States Patent
Leyh et al.

(10) Patent No.: US 10,129,820 B1
(45) Date of Patent: Nov. 13, 2018

(54) DEVICE AND METHOD FOR RADIO-FREQUENCY SITE EVALUATION

(71) Applicant: MOTOROLA SOLUTIONS, INC., Chicago, IL (US)

(72) Inventors: Arthur Christopher Leyh, Spring Grove, IL (US); Gregory J. Buchwald, Crystal Lake, IL (US); Bruce D. Mueller, Palatine, IL (US)

(73) Assignee: MOTOROLA SOLUTIONS, INC., Chicago, IL (US)

( * ) Notice: Subject to any disclaimer, the term of this patent is extended or adjusted under 35 U.S.C. 154(b) by 0 days.

(21) Appl. No.: 15/851,499

(22) Filed: Dec. 21, 2017

(51) Int. Cl.
*H04W 48/16* (2009.01)
*H04B 17/21* (2015.01)
*H04B 17/12* (2015.01)

(52) U.S. Cl.
CPC ............ *H04W 48/16* (2013.01); *H04B 17/12* (2015.01); *H04B 17/21* (2015.01)

(58) Field of Classification Search
CPC ........ H04W 48/16; H04B 17/21; H04B 17/12
See application file for complete search history.

(56) References Cited

U.S. PATENT DOCUMENTS

| | | | | |
|---|---|---|---|---|
| 5,809,420 A | * | 9/1998 | Ichiyanagi | H03G 3/3047 455/103 |
| 6,043,707 A | * | 3/2000 | Budnik | H03C 5/00 330/10 |
| 6,094,577 A | * | 7/2000 | Han | H04B 17/309 455/424 |
| 6,157,616 A | * | 12/2000 | Whitehead | H04L 47/10 370/252 |
| 6,397,041 B1 | | 5/2002 | Ballard et al. | |

(Continued)

OTHER PUBLICATIONS

Bird Technologies; "Bird Technologies Channel Power Monitor Measures Land Mobile Radio System Performance with High Precision"; https://www.birdrf.com/AboutUs/News/Bird-Introduces-Channel-Power-Monitor.aspx; Solon, Ohio; Jun. 18, 2017.

(Continued)

*Primary Examiner* — Babar Sarwar
(74) *Attorney, Agent, or Firm* — Perry + Currier, Inc.

(57) ABSTRACT

A device and method for radio-frequency site evaluation is provided. The radio-frequency site comprises one or more radio transmitters in communication with one or more transmit antennas, a monitoring radio receiver in communication with a receive antenna through a variable attenuator, and a controller in communication with the one or more radio transmitters, the monitoring radio receiver and the variable attenuator. The controller identifies the one or more radio transmitters which are currently transmitting, and responsively controls the variable attenuator to an attenuation value where a dynamic range of the monitoring radio receiver has a linear response for total power received at the receive antenna, the attenuation value associated with the one or more radio transmitters that are currently transmitting. Thereafter, the controller controls the monitoring radio receiver to scan at least currently active frequencies of the one or more radio transmitters, for example to detect problems at the site.

17 Claims, 18 Drawing Sheets

(56) References Cited

U.S. PATENT DOCUMENTS

| | | | | |
|---|---|---|---|---|
| 6,473,605 | B1* | 10/2002 | Ecklund | H03G 3/3052 375/285 |
| 6,810,239 | B2 | 10/2004 | Riddle | |
| 6,839,518 | B1* | 1/2005 | Minamimoto | H04B 10/077 398/160 |
| 7,193,459 | B1* | 3/2007 | Epperson | H03C 5/00 330/130 |
| 8,787,836 | B1 | 7/2014 | Carbajal | |
| 8,913,969 | B1* | 12/2014 | Honjo | H03F 1/3288 455/114.2 |
| 9,369,161 | B1* | 6/2016 | Chukka | H04B 1/0475 |
| 2004/0248516 | A1* | 12/2004 | Demir | H03F 1/3294 455/63.1 |
| 2008/0171560 | A1* | 7/2008 | Olbers | H04W 12/12 455/456.6 |
| 2010/0040381 | A1* | 2/2010 | Ohtani | H04B 10/2942 398/182 |
| 2010/0075703 | A1* | 3/2010 | Imai | H04B 7/0417 455/501 |
| 2010/0321233 | A1* | 12/2010 | Ben-Zur | H01Q 3/267 342/174 |
| 2011/0053525 | A1* | 3/2011 | Yi | G06K 7/0008 455/83 |
| 2012/0105151 | A1* | 5/2012 | Nakamura | H03F 1/0211 330/131 |
| 2013/0121691 | A1* | 5/2013 | Oda | H04J 14/0221 398/34 |
| 2014/0086081 | A1* | 3/2014 | MacK | H04L 5/006 370/252 |
| 2015/0118970 | A1* | 4/2015 | Thoukydides | H04B 17/14 455/67.14 |
| 2016/0134248 | A1* | 5/2016 | Onishi | H03F 1/3247 330/149 |
| 2016/0316422 | A1* | 10/2016 | Regan | H04W 48/16 |
| 2017/0194992 | A1* | 7/2017 | Kim | H04B 1/10 |
| 2017/0214461 | A1* | 7/2017 | Yamauchi | H04B 10/0793 |

OTHER PUBLICATIONS

National Instruments; "NI Real-Time Spectrum Analyzer IP and Reference Example"; http://www.ni.com/webcast/3693/en/; Apr. 1, 2015.

Tektronix; "Spectrum Analyzer H600 / SA2600 Series Data Sheet"; Jun. 15, 2017.

Keysight Technologies; "N6841A RF Sensor for Signal Monitoring Networks"; http://literature.cdn.keysight.com/litweb/pdf/5990-3839EN.pdf; Sep. 10, 2016.

Rhode & Schwartz; "R&S Argus 6.1 Spectrum Monitoring Software for Monitoring solutions in line with ITU recommendations"; https://cdn_rohde-schwarz.com/pws/dl_downloads/dl_common_library/dl_brochures_and_datasheets/pdf_1/ARGUS_bro_en_3607-1013-12_v0900.pdf; Dec. 1, 2017.

* cited by examiner

DEVICE AND METHOD FOR RADIO-FREQUENCY SITE EVALUATION

BACKGROUND OF THE INVENTION

Infrastructure radio-frequency sites, for example telecommunication towers and the like, generally combine multiple transmitters which transmit using common antennas. The health of the transmitters is not always known until a transmitter, or something in a radio-frequency chain, fails. In addition, such sites often include equipment from multiple operators, which may cause artifacts that degrade the performance of other systems. Hence, evaluation of such radio-frequency sites may be important to ensure continuity of telecommunications, which may be especially important when such radio-frequency sites include emergency service telecommunications equipment.

BRIEF DESCRIPTION OF THE SEVERAL VIEWS OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1:
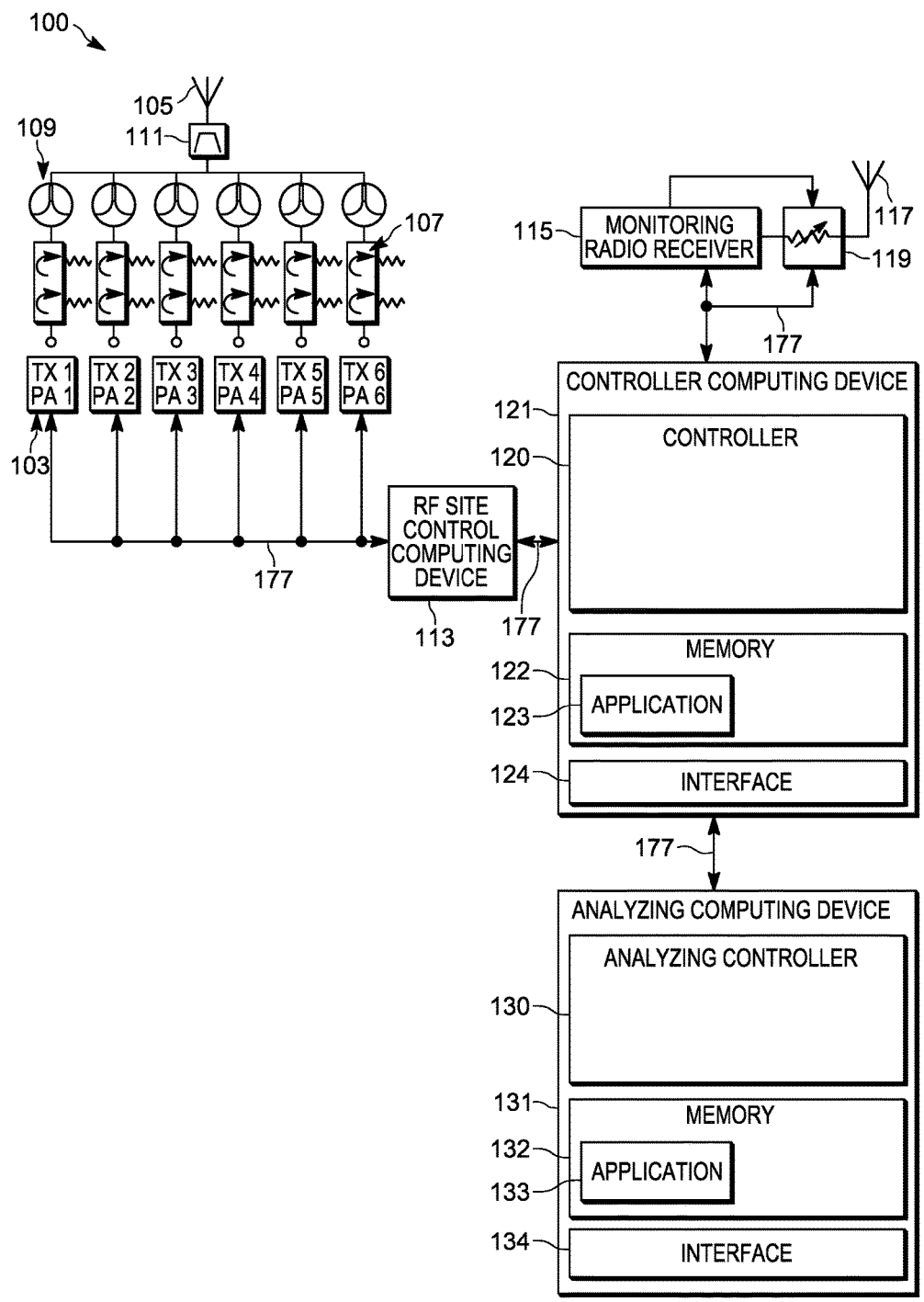
FIG. 1 is a schematic view of a system for radio-frequency site evaluation in accordance with some embodiments.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION OF THE INVENTION

Infrastructure radio-frequency sites, for example telecommunication towers and the like, generally combine multiple transmitters which transmit using common antennas. The health of the transmitters is not always known until a transmitter, or something in a radio-frequency chain, fails. In addition, such sites often include equipment from multiple operators, which may cause artifacts that degrade the performance of other systems. Hence, evaluation of such radio-frequency sites may be important to ensure continuity of telecommunications, which may be especially important when such radio-frequency sites include emergency service telecommunications equipment. Such radio-frequency sites may include bolted metal-to-metal and metal-to-oxidized-metal components and/or guy wires, which may cause intermodulation issues over time. In addition, degraded system components, (including, but not limited to, antennas, feedlines, radio-frequency (RF) cabling and/or other cabling) within close proximity of a radiating radio-frequency site may also produce undesired spectral components. Furthermore, when such radio-frequency sites include emergency service telecommunications equipment, the radio-frequency sites may have to meet regulatory requirements, such as FCC (Federal Communications Commission) and/or ETSI (European Telecommunications Standards Institute) requirements; if any of the emergency service telecommunications equipment start to degrade, such degradation may not only cause non-compliance but may also impact the performance of such emergency service telecommunications equipment. Hence, provided herein is a system for monitoring and/or evaluating a radio-frequency site, which may provide notifications of degradation so that it may be addressed prior to actual failure and/or non-compliance with regulatory requirements.

An aspect of the specification provides a system comprising: one or more radio transmitters in communication with one or more transmit antennas; a monitoring radio receiver in communication with a receive antenna through a variable attenuator; and a controller in communication with the one or more radio transmitters, the monitoring radio receiver and the variable attenuator, the controller configured to: identify the one or more radio transmitters which are currently transmitting; responsively control the variable attenuator to an attenuation value where a dynamic range of the monitoring radio receiver has a linear response for total power received at the receive antenna, the attenuation value associated with the one or more radio transmitters that are currently transmitting; and, thereafter, control the monitoring radio receiver to scan at least currently active frequencies of the one or more radio transmitters.

Another aspect of the specification provides a method comprising: identifying, at a controller, one or more radio transmitters which are currently transmitting, one or more radio transmitters in communication with one or more transmit antennas, the controller in communication with the one or more radio transmitters, a monitoring radio receiver and a variable attenuator, the monitoring radio receiver in communication with a receive antenna through the variable attenuator; responsively controlling, at the controller, the variable attenuator to an attenuation value where a dynamic range of the monitoring radio receiver has a linear response for total power received at the receive antenna, the attenuation value associated with the one or more radio transmitters that are currently transmitting; and, thereafter, controlling, at the controller, the monitoring radio receiver to scan at least currently active frequencies of the one or more radio transmitters.

Attention is directed to FIG. 1, which depicts a schematic view of a system 100 for radio-frequency (RF) site evaluation. The system 100 comprises a radio frequency site that includes one or more radio transmitters 103, labelled TX1, TX2, TX3, TX4, TX5, TX6, each of which includes a respective power amplifier, labelled PA1, PA2, PA3, PA4, PA5, PA6. While present example embodiments are described with respect to six transmitters 103, the RF site may include any number of transmitters 103 that may be used at such RF sites. At the example RF site, the one or more radio transmitter 103 are in communication with one or more transmit antennas 105 (in the depicted example embodiments one transmit antenna 105), for example, as depicted, via a respective circulator 107, a respective cavity filter 109, and a common bandpass filter 111.

In general, the radio transmitters 103, interchangeably referred to hereafter, collectively, as the transmitters 103 and, generically, as a transmitter 103, transmit signals at given respective frequencies, for example using channels and/or channel communication, and under control of a RF site control computing device 113, such as base station controller computing device, and the like, which is in turn in communication with telecommunications infrastructure components (not depicted), for example, a communications network, a cell phone network, an emergency services network, and the like. In general, electrical and/or structural components of the transmitters 103, the circulators 107, the filters 109, 111 and/or the antenna 105 may degrade over time which may introduce intermodulation frequencies to frequencies transmitted by the transmit antenna 105. Indeed, the presence of such intermodulation frequencies, and/or a change in such intermodulation frequencies over time, may indicate a degradation of the RF site including, but not limited to, loads on one or more of the circulators 107 may be starting to fail, one or more of the power amplifiers PA1, PA2, PA3, PA4, PA5, PA6 may be starting to fail, and the like.

However, degradation of the RF site may also be indicated by a decrease in transmitter intensity over time.

Furthermore, the presence of other frequencies in the region of the RF site may contribute to at least temporary degradation of the RF site, such other frequencies originating at, for example, nearby RF sites, jamming equipment, and the like.

Hence, to monitor the RF site, the system 100 further includes a monitoring radio receiver 115 in communication with a receive antenna 117 through a variable attenuator 119. The receive antenna 117 is positioned proximal the transmit antenna 105 such that frequencies transmitted by the transmit antenna 105 may be monitored, as well as other frequencies in the region of the RF site. The variable attenuator 119 is configured to be controlled through a range of attenuation values, that may include, but is not limited to, about zero attenuation to about infinite attenuation, and the like; for example, the variable attenuator 119 may comprise a variable resistor, and the like, between the receive antenna 117 and an input to the monitoring radio receiver 115, such that the variable attenuator 119 attenuates power received at the receive antenna 117 prior to the power being measured by the monitoring radio receiver 115.

In general, a radio receiver that has a dynamic range of at least 70 dB may be selected for the monitoring radio receiver 115 as 70 dB is often a required limitation of occupied bandwidth and spurious emissions of radio transmitters that are regulated by, for example, the FCC and/or ETSI. However, as will be described in more detail below, radio receiver that has a dynamic range of at least about 80 dB to about 100 dB, and higher, may be selected for the monitoring radio receiver 115.

Furthermore, the monitoring radio receiver 115 is generally configured to acquire scans of frequencies in the range of frequencies transmitted by the transmitters 103. For example, such scans may include scanning for received signal strength intensity (RSSI) as a function of frequency, which is generally indicative of power received at an input to the monitoring radio receiver 115 (e.g. from the receive antenna 117). Furthermore, while the terms scan and scanning are used here to describe such acquiring, the terms scan and/or scanning may include acquiring the RSSI data in a frequency binning process and/or by acquiring RSSI data in frequency bins concurrently, as well sequentially scanning through frequencies.

The range of frequencies over which the transmitters 103 transmit, and over which the monitoring radio receiver 115 is configured to scan, may be dependent on a type of communication network for which the transmitters 103 are being used. For example, the transmitters 103 may be components of a Project 25 (P25) emergency services network, and hence the frequencies over which the transmitters 103 transmit, and over which the monitoring radio receiver 115 scans, may be around 700 MHz, with channel bandwidth being in a range of 6.25 kHz to 12.5 kHz (in other words, the different frequencies at which the transmitters 103 may transmit may be separated by 6.25 kHz to 12.5 kHz). Similarly, the transmitters 103 may be components of a Long-Term Evolution (LTE) cell phone network, and hence the frequencies over which the transmitters 103 transmit, and over which the monitoring radio receiver 115 scans, may be in a range of about 450 MHz to about 6 GHz (depending on jurisdiction), with channel bandwidth being in a range of 1.4 MHz to 20 MHz (depending on jurisdiction). However, the transmitters 103 and the monitoring radio receiver 115 may be adapted for any type of communication network.

Figure 18:
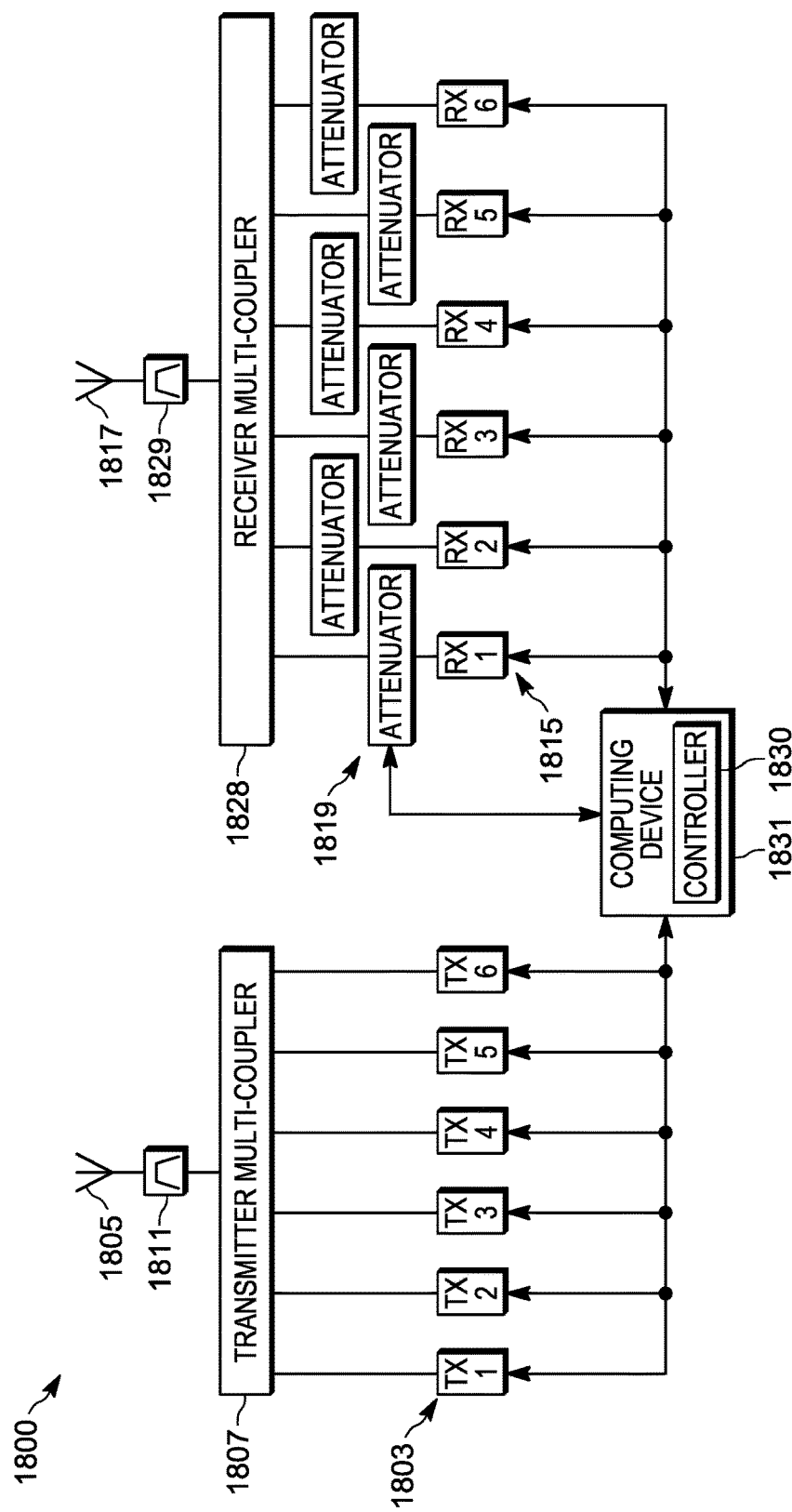
FIG. 18 is a schematic view of an alternative system for radio-frequency site evaluation in accordance with some embodiments Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

While in the depicted example embodiments, the monitoring radio receiver 115 is depicted as being separate from the one or more transmitters 103, in other embodiments the monitoring radio receiver 115 may be combined with one of the one or more of transmitters 103, for example as transceivers. For example, while not depicted, each of the transmitters 103 may further comprise a respective radio transceiver configured to receive signals from one or more receiver antennas (which may include, but is not limited to, the receiver antenna 117) at given respective frequencies as part of the RF site, and may further be in communication with and/or under control of the RF site control computing device 113. In such configurations, each of the radio transmitters may also be in communication with one or more receiver antennas via a respective circulator 107 and a respective cavity filter 109, as well as a bandpass filter. In other words, the monitoring radio receiver 115 and the receive antenna 105 may be components of the RF site that are adapted to monitor the RF site and/or the monitoring radio receiver 115, and are otherwise configured to receive signals on channels for conveyance to a communication network, a cell phone network, an emergency services network, and the like. An example of such a configuration is described below with respect to FIG. 18. Alternatively (as depicted), the receive antenna 105 may be components that are dedicated to monitoring the RF site.

Either way, the system 100 further comprises a controller 120 in communication with the one or more radio transmitters 103 (e.g. via the RF site control computing device 113), the monitoring radio receiver 115 and the variable attenuator 119. As depicted, the controller 120 is a component of a controller computing device 121 which comprises the controller 120, a memory 122 storing an application 123 and a communication interface 124 (interchangeably referred to hereafter as the interface 124).

As depicted, the system 100 further comprises an analyzing controller 130 in communication with the controller 120; as depicted, the analyzing controller 130 is a component of an analyzing computing device 131 which comprises the analyzer controller 130, a memory 132 storing an application 133 and a communication interface 134 (interchangeably referred to hereafter as the interface 134).

The functionality of the controller computing device 121 and the analyzing computing device 131 are described in further detail below.

While components of the RF site control computing device 113 are not depicted, it is assumed that the RF site control computing device 113 comprises a respective controller, memory and communication interface, similar to the computing devices 121, 131, but adapted, for example, for base station controller functionality.

The components of the system 100 are generally configured to communicate with each other via communication links 177, which may include wired and/or wireless links (e.g. cables, communication networks, the Internet, and the like) as desired.

However, computing resources and/or memory resources may be shared between the computing devices 113, 121, 131 using the link 177 therebetween.

In other words, the functionality of the system 100 may be distributed between one or more of the computing devices 113, 121, 131.

Alternatively, the functionality of the system 100 may be combined at one or more of the computing devices 113, 121, 131; for example, the functionality of the computing devices 121, 131 may be combined in one computing device.

Furthermore, in some embodiments, the computing devices 113, 121, 131 may be implemented as one or more servers and/or in a cloud computing environment, with functionality of the computing devices 113, 121, 131 being distributed between one or more servers and/or distributed in the cloud computing environment. In other words, one or more of the computing devices 113, 121, 131 may be located at a location which is remote from the RF site.

Furthermore, in some embodiments, the monitoring radio receiver 115, the receiver antenna 117, and the variable attenuator 119 may be integrated with the controller computing device 121.

Each of the controllers 120, 130 includes one or more logic circuits configured to implement functionality for radio-frequency site evaluation. Example logic circuits include one or more processors, one or more electronic processors, one or more microprocessors, one or more ASIC (application-specific integrated circuits) and one or more FPGA (field-programmable gate arrays). In some embodiments, one or more of the controllers 120, 130 and/or one or more of the computing devices 121, 131 are not generic controllers and/or a generic computing devices, but controllers and/or computing device specifically configured to implement functionality for radio-frequency site evaluation. For example, in some embodiments, one or more of the controllers 120, 130 and/or one or more of the computing devices 121, 131 specifically comprises a computer executable engine configured to implement specific functionality for radio-frequency site evaluation.

The memories 122, 132 each comprise a machine readable medium that stores machine readable instructions to implement one or more programs or applications. Example machine readable media include a non-volatile storage unit (e.g. Erasable Electronic Programmable Read Only Memory ("EEPROM"), Flash Memory) and/or a volatile storage unit (e.g. random-access memory ("RAM")). In the embodiment of FIG. 1, programming instructions (e.g., machine readable instructions) that implement the functional teachings of the computing devices 121. 131 as described herein are maintained, persistently, at the memories 122, 132 and used by the respective controllers 120, 130 which makes appropriate utilization of volatile storage during the execution of such programming instructions.

For example, each of the memories 122, 132 store respective instructions corresponding to the applications 123, 133 that, when executed by the respective controllers 120, 130 implement the functionality of the system 100.

In example embodiments, when the controller 120 implements the application 123, the controller 120 is configured to: identify the one or more radio transmitters 103 which are currently transmitting; responsively control the variable attenuator 119 to an attenuation value where a dynamic range of the monitoring radio receiver 103 has a linear response for total power received at the receive antenna 117, the attenuation value associated with the one or more radio transmitters 103 that are currently transmitting; and, thereafter, control the monitoring radio receiver 115 to scan at least currently active frequencies of the one or more radio transmitters 103.

Furthermore, in some embodiments, when the controllers 120 implements the application 123, the controller 120 is further configured to calibrate the system 100, including, the variable attenuator 119 by: sequentially controlling the one or more radio transmitters 103 to transmit at a respective maximum power level at one or more given respective frequencies, at least one of individually and in combinations of two or more; for each of the one or more radio transmitters 103 transmitting during the sequentially controlling, controlling the variable attenuator 119 to a respective attenuation value where the monitoring radio receiver 115 has a respective linear response for total power received at the receive antenna 117; and storing the respective attenuation value (e.g. at the memory 122) in association with an identifier identifying the one or more radio transmitters 103 which were transmitting when the respective attenuation value was determined.

Furthermore, in example embodiments, when the analyzing controller 130 implements the application 133, the analyzing controller 130 is configured to: analyze scans from the monitoring radio receiver 115 to identify problems with the one or more radio transmitters 103, for example to one or more of: track behavior of the one or more radio transmitters 103 as a function of time; provide and/or generate a report indicative of the problems; and initiate remedial action to address the problems.

Hence, the controller 120 is generally configured to calibrate the monitoring radio receiver 115 and the variable attenuator 119, and control the monitoring radio receiver 115 and the variable attenuator 119 to perform scans that are used by the analyzing controller 130 to evaluate the RF site. However, such functionality may be combined at one or more of the controller 120, 130 and/or at one or more of the computing devices 113, 121, 131.

The interfaces 124, 134 desired (as well as a respective interface at the RF site control computing device 113) are generally configured to communicate using respective links 177 which are wired and/or wireless as desired (as is a respective interface at the RF site control computing device 113). The interfaces 124, 134 may implemented by, for example, one or more cables, one or more radios and/or connectors and/or network adaptors, configured to communicate wired and/or wirelessly, with network architecture that is used to implement the respective communication links 177.

The interfaces 124, 134 may include, but are not limited to, one or more broadband and/or narrowband transceivers, such as a Long Term Evolution (LTE) transceiver, a Third Generation (3G) (3GGP or 3GGP2) transceiver, an Association of Public Safety Communication Officials (APCO) Project 25 (P25) transceiver, a Digital Mobile Radio (DMR) transceiver, a Terrestrial Trunked Radio (TETRA) transceiver, a WiMAX transceiver operating in accordance with an IEEE 802.16 standard, and/or other similar type of wireless transceiver configurable to communicate via a wireless network for infrastructure communications.

In yet further embodiments, the interfaces 124, 134 may include one or more local area network or personal area network transceivers operating in accordance with an IEEE 802.11 standard (e.g., 802.11a, 802.11b, 802.11g), or a Bluetooth™ transceiver which may be used to communicate to implement the respective communication links 177.

However, in other embodiments, the interfaces 124, 134 communicate over the links 177 using other servers and/or communication devices and/or network infrastructure devices, for example by communicating with the other servers and/or communication devices and/or network infrastructure devices using, for example, packet-based and/or internet protocol communications, and the like. In other words, the links 177 may include other servers and/or communication devices and/or network infrastructure devices, other than the depicted components of the system 100.

In any event, it should be understood that a wide variety of configurations for the computing devices 121, 131 are within the scope of present embodiments.

Figure 2:
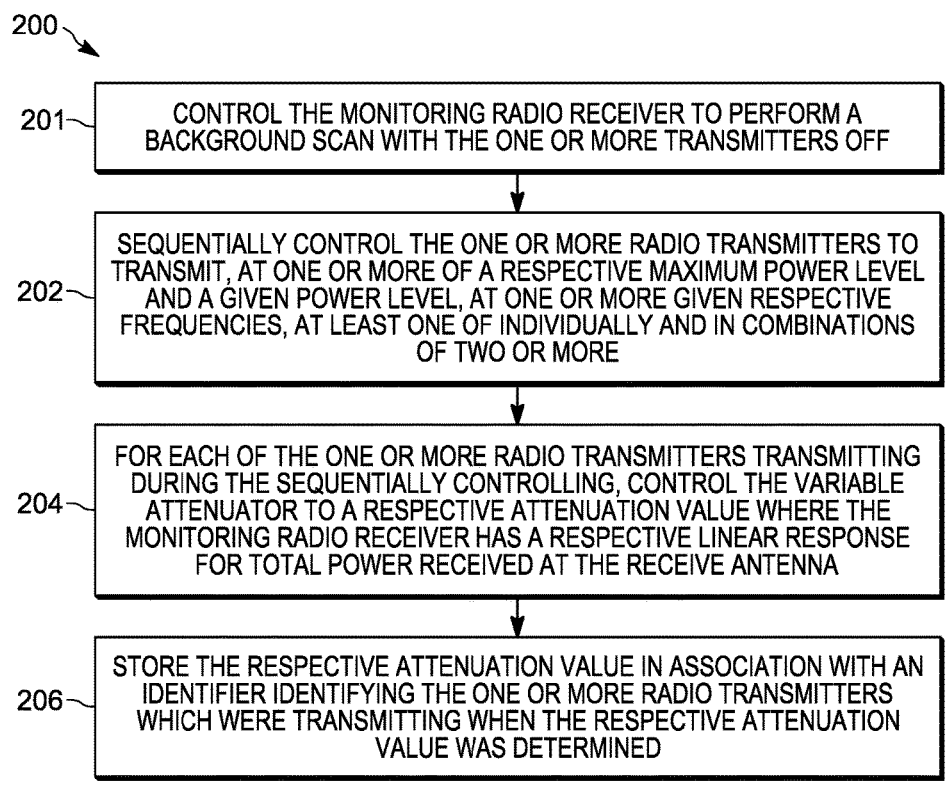
FIG. 2 is a flowchart of a method for calibrating a radio-frequency site monitoring radio receiver in accordance with some embodiments.

Attention is now directed to FIG. 2 which depicts a flowchart representative of a method 200 for calibrating the system 100 including calibrating the variable attenuator 119. The operations of the method 200 of FIG. 2 correspond to machine readable instructions that are executed by, for example, the computing device 121, and specifically by the controller 120 of the computing device 121. In the illustrated example, the instructions represented by the blocks of FIG. 2 are stored at the memory 122, for example, as the application 123. The method 200 of FIG. 2 is one way in which the controller 120 and/or the computing device 121 and/or the system 100 is configured. Furthermore, the following discussion of the method 200 of FIG. 2 will lead to a further understanding of the system 100, and its various components. However, it is to be understood that the method 200 and/or the system 100 may be varied, and need not work exactly as discussed herein in conjunction with each other, and that such variations are within the scope of present embodiments.

The method 200 of FIG. 2 need not be performed in the exact sequence as shown and likewise various blocks may be performed in parallel rather than in sequence. Accordingly, the elements of method 200 are referred to herein as "blocks" rather than "steps." The method 200 of FIG. 2 may be implemented on variations of the system 100 of FIG. 1, as well.

At a block 201, the controller 120 controls the monitoring radio receiver 115 to perform a background scan with the one or more transmitters 103 off (e.g. not transmitting).

At a block 202, the controller 120 sequentially controls the one or more radio transmitters 103 to transmit, at one or more of a respective maximum power level and a given power level, at one or more given respective frequencies, at least one of individually and in combinations of two or more.

At a block 204, for each of the one or more radio transmitters 103 transmitting during the sequentially controlling, the controller 120 controls the variable attenuator 119 to a respective attenuation value where the monitoring radio receiver 115 has a respective linear response for total power received at the receive antenna 117.

At a block 206, the controller 120 stores the respective attenuation value (e.g. at the memory 122) in association with an identifier identifying the one or more radio transmitters 103 which were transmitting when the respective attenuation value was determined.

Figure 3:
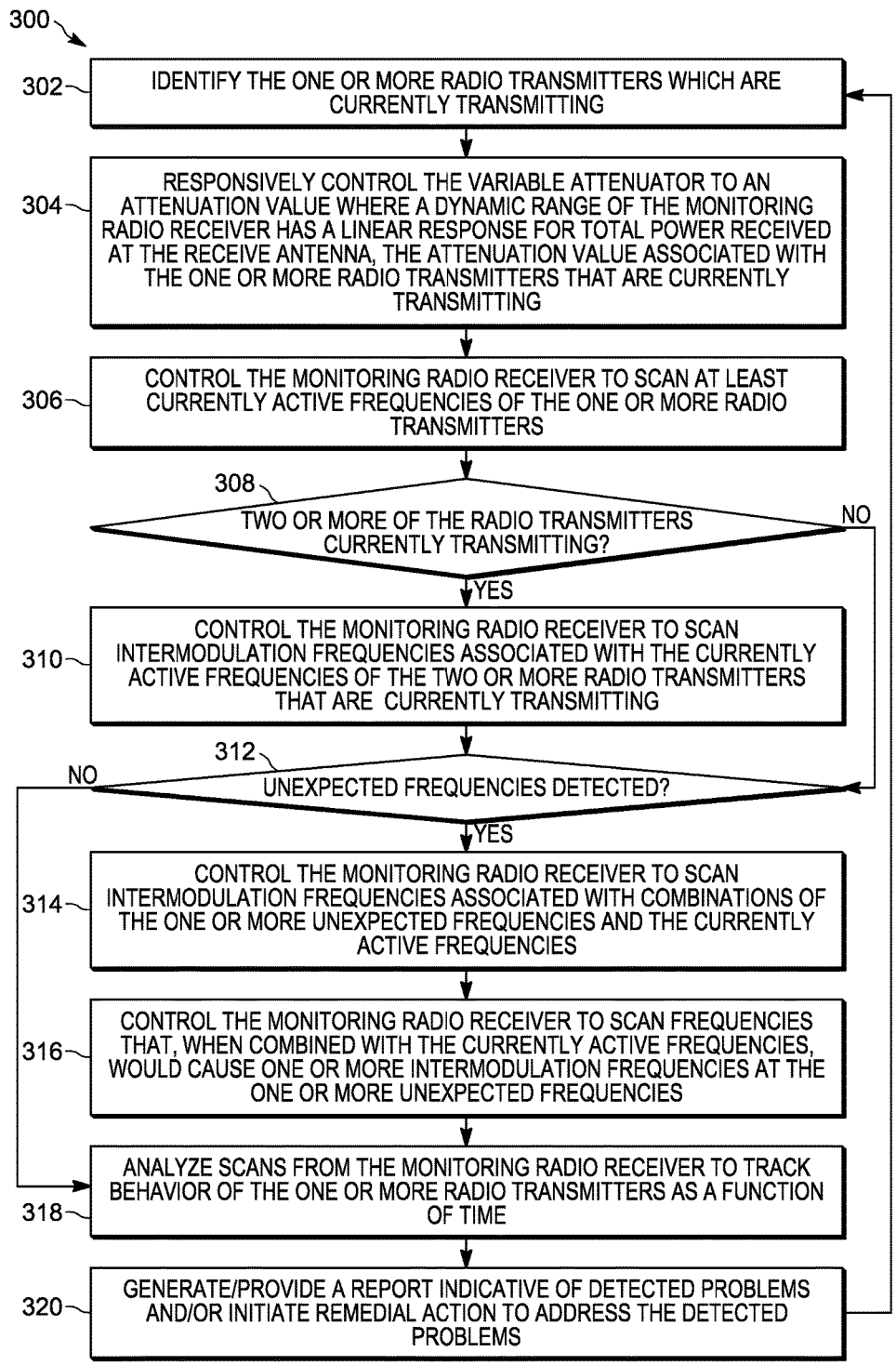
FIG. 3 is a flowchart of a method for radio-frequency site evaluation in accordance with some embodiments.

Attention is now directed to FIG. 3 which depicts a flowchart representative of a method 300 for radio-frequency site evaluation. The operations of the method 300 of FIG. 3 correspond to machine readable instructions that are executed by, for example, one or more of the computing devices 121. 131, and specifically by one or more of the controllers 120, 130 of the computing devices 121. 131. In the illustrated example, the instructions represented by the blocks of FIG. 3 are stored at one or more of the memories 122, 132, for example, as the applications 123, 133. The method 300 of FIG. 3 is one way in which the controllers 120, 130 and/or the computing devices 121. 131 and/or the system 100 is configured. Furthermore, the following discussion of the method 300 of FIG. 3 will lead to a further understanding of the system 100, and its various components. However, it is to be understood that the method 300 and/or the system 100 may be varied, and need not work exactly as discussed herein in conjunction with each other, and that such variations are within the scope of present embodiments.

The method 300 of FIG. 3 need not be performed in the exact sequence as shown and likewise various blocks may be performed in parallel rather than in sequence. Accordingly, the elements of method 300 are referred to herein as "blocks" rather than "steps." The method 300 of FIG. 3 may be implemented on variations of the system 100 of FIG. 1, as well.

At a block 302, the controller 120 identifies the one or more radio transmitters 103 which are currently transmitting.

At a block 304, the controller 120 responsively controls the variable attenuator 119 to an attenuation value where a dynamic range of the monitoring radio receiver 103 has a linear response for total power received at the receive antenna 117, the attenuation value associated with the one or more radio transmitters 103 that are currently transmitting.

At a block 306, the controller 120 controls the monitoring radio receiver 115 to scan at least currently active frequencies of the one or more radio transmitters 103. It is assumed that such scans are stored at one or more of the memories 122, 132 and/or that the analyzer controller 130 of the analyzing computing device 131 has access to the scans at one or more of the memories 122, 132.

In embodiments where the monitoring radio receiver 115 is combined with one or more of the transmitters 103, the block 306 may occur when the monitoring radio receiver 115 is not otherwise being used to receive signals on channels. Put another way, when a transceiver, that includes a transmitter 103, is not being used for channel communication, the radio receiver of the transceiver may be controlled to scan at least currently active frequencies of the one or more radio transmitters 103.

At a block 308, the controller 120 determines whether two or more of the radio transmitters 103 are currently transmitting. When two or more of the radio transmitters 103 are currently transmitting (e.g. a "YES" decision at the block 308), at a block 310, the controller 120 controls the monitoring radio receiver 115 to scan intermodulation frequencies associated with the currently active frequencies of the two or more radio transmitters 103 that are currently transmitting. It is assumed that such scans are stored at one or more of the memories 122, 132 and/or that the analyzer controller 130 of the analyzing computing device 131 has access to the scans at one or more of the memories 122, 132.

At a block 312, which may occur when two or more of the radio transmitters 103 are currently transmitting or two or more of the radio transmitters 103 are not currently transmitting (e.g. a "NO" decision at the block 308), the controller 120 determines whether unexpected frequencies are detected in the scan that occurs at the block 306 and/or at the block 310. Such unexpected frequencies may include, but are not limited to, frequencies that do not correspond to the currently active frequencies of the radio transmitters 103 are currently transmitting and/or intermodulation frequencies of two or more of the radio transmitters 103 are currently transmitting and/or background frequencies determined from the background scan performed at the block 201 of the method 200.

Such unexpected frequencies may include, but are not limited to: frequencies from radio transmitters that are not part of the RF site of the system 100, that may include, but are not limited to, new RF sites in the vicinity of the RF site of the system 100, and jamming transmitters; and intermodulation frequencies due to combinations of the currently active frequencies of the transmitters 103 and frequencies from radio transmitters that are not part of the RF site of the system 100.

Hence, when unexpected frequencies are detected (e.g. a "YES" decision at the block 312), at a block 314, the controller 120 controls the monitoring radio receiver 115 to scan intermodulation frequencies associated with combinations of the one or more unexpected frequencies and the currently active frequencies. Similarly, when unexpected frequencies are detected (e.g. a "YES" decision at the block 312), at a block 316, the controller 120 controls the monitoring radio receiver 115 to scan frequencies that, when combined with the currently active frequencies, would cause one or more intermodulation frequencies at the one or more unexpected frequencies. In this manner, the controller 120 controls the monitoring radio receiver 115 to search for further unexpected frequencies, which may be indicative of problems at the RF site of the system 100. It is assumed that such scans that occur at the blocks 314, 316 are stored at one or more of the memories 122, 132 and/or that the analyzer controller 130 of the analyzing computing device 131 has access to the scans at one or more of the memories 122, 132.

At a block 318, which may occur when unexpected frequencies are detected or when unexpected frequencies are not detected (e.g. a "NO" decision at the block 312), the analyzer controller 130 analyzes scans from the monitoring radio receiver 115 to track behavior of the one or more radio transmitters 103 as a function of time. It is assumed at the block 318 that the analyzer controller 130 at the analyzing computing device 131 has access to scans performed by the monitoring radio receiver 115 stored at one or more of the memories 122, 132.

At a block 320, the analyzer controller 130 generates and/or provides a report of detected problems with the one or more radio transmitters 103, which may include, but are not limited to, detecting unexpected frequencies, intermodulation frequencies, and degradation of power of frequencies of the transmitters 103 as a function of time. Alternatively, and/or in addition to generating such a report, the analyzer controller 130 may initiate remedial action to address the detected problems, which may include, but is not limited to: notifying an administrator of the system 100 of the detected problems for example via a message to a communication device of the administrator; transmitting the report to the communication device of the administrator; causing channel assignments at the transmitters 103 to be prioritized; and/or turning one or more of the transmitters 103, where a problem was detected, off.

The method 200 and the method 300 will now be described with reference to FIG. 4 to FIG. 17.

Figure 4:
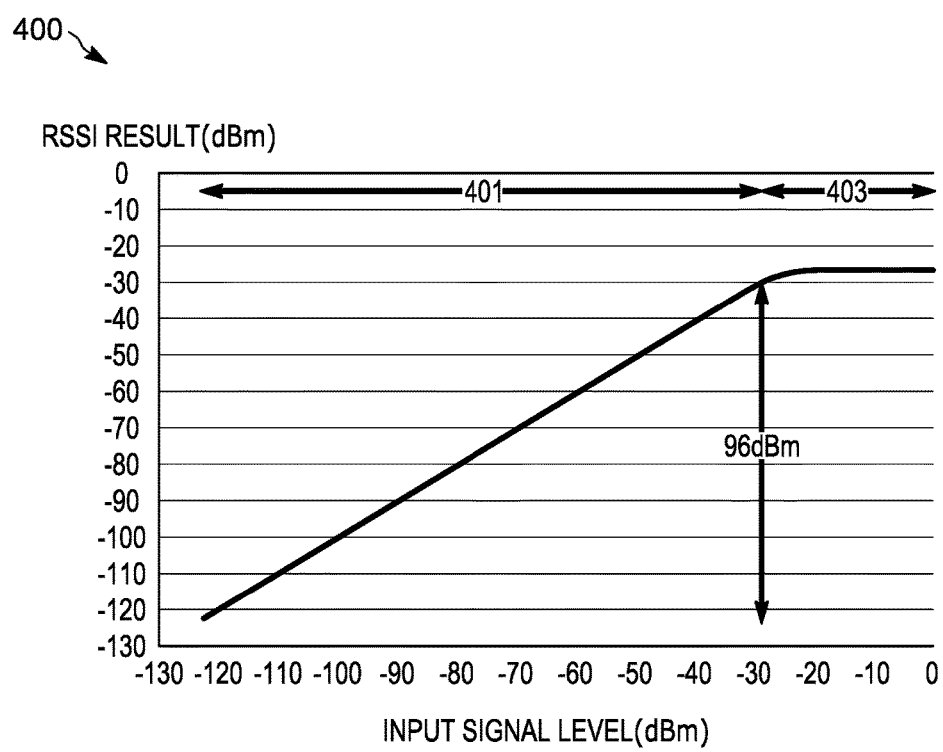
FIG. 4 is an example response curve representing received relative signal strength as a function of incoming received power signal level of a monitoring radio receiver in accordance with some embodiments.

Attention is next directed to FIG. 4 which depicts an example response curve 400 of an example monitoring radio receiver 115. For example, the response curve 400 depicts RSSI (in dBm) measured by the monitoring radio receiver 115 as a function of an input signal level (in dBm) (e.g. received power signal level), and specifically the input signal level for total power received at the monitoring radio receiver 115 from the receive antenna 117, example response curve representing received relative signal strength as a function of incoming received power signal level of a monitoring radio receiver independent of frequency. Ideally, the input signal level and the measured RSSI are similar and/or are linearly related over the entire dynamic range of the monitoring radio receiver 115. Indeed, the curve 400 includes a linear region 401, where the dynamic range of the monitoring radio receiver 115 has a linear response for input signal levels from about −126 dBm to about −30 dBm. However, above an input signal level of about −30 dBm, the curve 400 includes a non-linear region 403 where the dynamic range of the monitoring radio receiver 115 has a non-linear response. Indeed, in the non-linear region 403, the measured RSSI remains at about −25, even as the input signal level increases. Put another way, in the non-linear region 403, the monitoring radio receiver 115 is saturated. Hence, for input signal levels above about −30 dBm, the measured RSSI is not representative of the input signal level. As will be described below, to address this, the variable attenuator 119 is controlled to an attenuation value where a dynamic range of the monitoring radio receiver 115 has a linear response for total power received at the receive antenna 117.

Hence, the useful dynamic range of the example monitoring radio receiver 115 is about 96 dBm (e.g. from −126 dBm to about −30 dBm in the linear region 401). Such a dynamic range may be useful in detecting intermodulation frequencies, and other types of unexpected frequencies that may be due to degradation of the RF site of the system 100.

Figure 5:
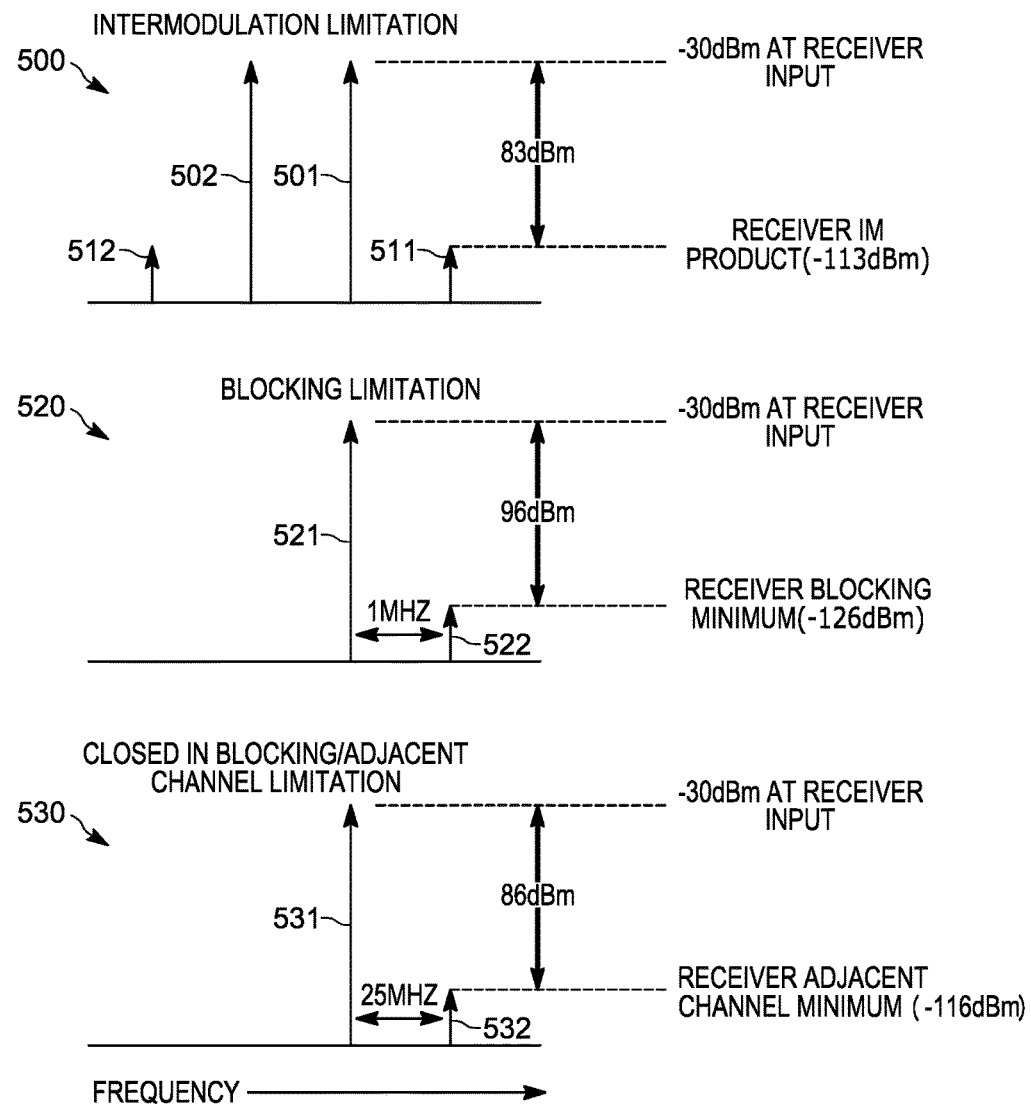
FIG. 5 depicts examples of intermodulation frequencies, blocking frequencies and adjacent channel blocking frequencies in accordance with some embodiments.

For example, attention is next directed to FIG. 5 which depicts an example 500 of two frequencies 501, 502 measured by the monitoring radio receiver 115, the two frequencies 501, 502 emitted by two respective transmitters 103, as well as two intermodulation frequencies (also referred to intermodulation (IM) products) 511, 512 that may be measured by the monitoring radio receiver 115 due to interaction between the frequencies 501, 502. As depicted, the frequencies 501, 502 each have an intensity (e.g. RSSI) of −30 dBm, while each of the intermodulation frequencies 511, 512 each have an intensity (e.g. RSSI) of −113 dBm, which may be a typical intensity at which such intermodulation frequencies appear (e.g. an "Intermodulation Limitation"). Furthermore, an intensity difference between the frequencies 501, 502 and the intermodulation frequencies 511, 512 is about 83 dBm. As the dynamic range of the example monitoring radio receiver 115 of FIG. 4 is 96 dBm, with a minimum of −126 dBm, the example monitoring radio receiver 115 is suited to detecting both of the frequencies 501, 502 and the intermodulation frequencies 511, 512, and furthermore suited for measuring the frequencies 501, 502 and the intermodulation frequencies 511, 512 as a function of time, presuming that the total power intensity of the frequencies 501, 502, as well as background power, is within the region 401 of the example monitoring radio receiver 115. Changes to the frequencies 501, 502 and/or the intermodulation frequencies 511, 512 as a function of time may indicate problems with the transmitters 103 emitting the frequencies 501, 502, and/or associated components (including, but not limited to, an associated power amplifier, circulator 107 and/or cavity filter 109).

FIG. 5 also depicts an example 520 of a frequency 521 measured by the monitoring radio receiver 115, the frequency 521 emitted by a first transmitter 103, as well as a second frequency 522 emitted by a second transmitter 103; this second frequency 522 is blocked from proper reception by a high received power level of the frequency 521 from the first transmitter 103 (e.g. the second frequency 522 being at a channel frequency that is about 1 MHz or greater from a channel of the first frequency 521). As depicted, the first frequency 521 has an intensity (e.g. RSSI) of −30 dBm, while the blocked second frequency 522 has an intensity (e.g. RSSI) of −126 dBm, which may be a typical intensity to which frequencies may be blocked (e.g. a "Blocking Limitation"). Furthermore, an intensity difference between the frequencies 521, 522 is about 96 dBm. As the dynamic range of the example monitoring radio receiver 115 of FIG. 4 is 96 dBm, with a minimum of −126 dBm, the example monitoring radio receiver 115 is about suited to detecting both of the frequencies 521, 522 and furthermore suited for measuring the frequencies 521, 522 as a function of time, presuming that the total power intensity of the frequencies 521, 522, as well as background power, is within the region 401 of the example monitoring radio receiver 115. However, if the blocked second frequency 522 falls below −126 dBm it may not be measurable; however, increases in the blocked second frequency 522 as a function of time may indicate problems with the transmitter 103 emitting the first frequency 521, and/or associated components (including, but not limited to, an associated power amplifier, circulator 107 and/or cavity filter 109).

FIG. 5 also depicts an example 530 of a frequency 531 measured by the monitoring radio receiver 115, the frequency 531 emitted by a first transmitter 103, as well as a second frequency 532 emitted by a second transmitter 103 that is blocked by the first transmitter 103, the second frequency 532 being at an adjacent channel. In narrow band land-mobile allocations this may be represented by a channel raster that may include, but is not limited to: 6.25, 12.5, or 25 kHz. This is represented in FIG. 5 as 25 kHz but may be any respective value by regulatory or system standards. As depicted, the first frequency 531 has an intensity (e.g. RSSI) of −30 dBm, while the blocked second frequency 532 has an intensity (e.g. RSSI) of −116 dBm, which may be a typical intensity to which frequencies of adjacent may be blocked (e.g. a "Close In Blocking/Adjacent Channel Limitation"). Furthermore, an intensity difference between the frequencies 531, 532 is about 96 dBm. As the dynamic range of the example monitoring radio receiver 115 of FIG. 4 is 86 dBm, with a minimum of −116 dBm, the example monitoring radio receiver 115 is about suited to detecting both of the frequencies 531, 532 and furthermore suited for measuring the frequencies 531, 532 as a function of time, presuming that the total power intensity of the frequencies 531, 532, as well as background power, is within the region 401 of the example monitoring radio receiver 115. Changes to the frequencies 531, 532 as a function of time may indicate problems with the transmitters 103 emitting the frequencies 531, 532, and/or associated components (including, but not limited to, an associated power amplifier, circulator 107 and/or cavity filter 109).

Hence, in general, the variable attenuator 119 is controlled to ensure that the dynamic range of the monitoring radio receiver 103 has a linear response, for example using the method 200 and the method 300.

Figure 6:
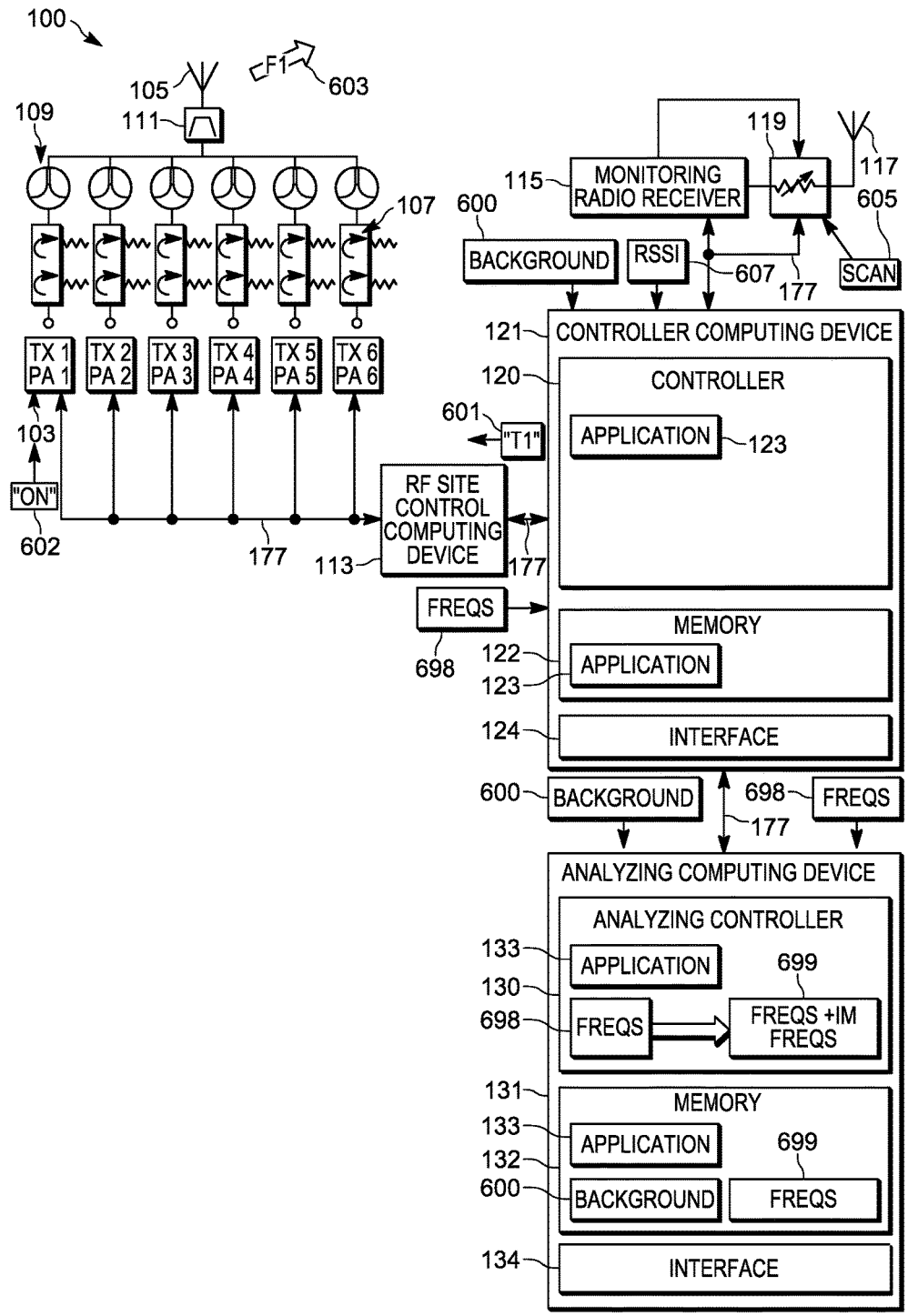
FIG. 6 depicts the system of FIG. 1 in a calibration mode, while calibrating the monitoring radio receiver while one radio transmitter is transmitting in accordance with some embodiments.

Attention is next directed to FIG. 6, which is substantially similar to FIG. 1, with like elements having like numbers. In FIG. 6, the controller 120 is executing the application 123 and hence executing the method 200. Furthermore, FIG. 6 depicts an example embodiment of the blocks 201, 202, 204 of the method 200.

For example, initially, the controller 120 may control (e.g. at the block 201 of the method 200) the monitoring radio receiver 115 to acquire a background scan 600 of power received at the receive antenna 117. Such a background scan 600 may include adjusting the variable attenuator 119 to an attenuation value where the dynamic range of the monitoring radio receiver 115 has a linear response, as described in further detail below. The background scan 600 may be stored at the memory 122 and/or, as depicted, provided to the analyzer controller 130 for storage at the memory 132. The background scan 600 generally includes frequencies of background signals and/or frequencies from signals of nearby RF sites, and the like.

As also depicted in FIG. 6, the RF site control computing device 113 may provide the controller 120 with data 698 indicative of frequencies transmitted by the transmitters 103 during channel communications, which may include power levels at which the transmitters 103 transmit during channel communications, as well as identifiers of the transmitters 103.

As depicted, the data 698 is provided to the analyzing controller 130 which may determine, from the frequencies in the data 698, intermodulation frequencies for the combinations of the frequencies in the data 698; as depicted the frequencies in the data 698 and the determined intermodulation frequencies are stored as data 699 at the memory 132. Alternatively, the controller 120 may generate the data 699 and store the data 699 at the memory 122.

Furthermore, prior to, or following the background scan 600, in FIG. 6, the controller 120 transmits control instructions 601 to the RF site control computing device 113 (e.g. at the block 202 of the method 200) to instruct the RF site control computing device 113 to instruct a transmitter 103, for example, the transmitter TX1, to transmit. The control instructions 601 may include an identifier of the transmitter TX1 as received in the data 698 and/or as stored in the data 699.

In turn, the RF site control computing device 113 transmits control instructions 602 to the transmitter 103 identified in the control instructions 601 (e.g. the transmitter TX1) to transmit a signal 603 at a respective frequency F1 using the transmit antenna 105. For example, the transmitter TX1 is controlled to transmit the signal 603 at the frequency F1 at a maximum power. Alternatively, the transmitter TX1 is controlled to transmit at a given power level, for example a power level that is usually used for channel communications. It is assumed that the other transmitters TX2, TX3, TX4, TX5, TX6 are not transmitting.

In response, the monitoring radio receiver 115 measures total power received at the receive antenna 117, which generally includes power from the signal 603, as well as power from background signals and/or power from signals of nearby RF sites, etc.

Furthermore, while the transmitter TX1 is transmitting the signal 603 at the respective frequency F1 at using the transmit antenna 105, the controller 120 controls the variable attenuator 119 (e.g. at the block 204 of the method 200), for example using control instructions 605, to scan through a range of attenuation values to attenuate the input signal to the monitoring radio receiver 115, while monitoring the measured RSSI 607, and the like, measured at the monitoring radio receiver 115. The control instructions 605 may include, but are not limited to, a plurality of instructions, each of which including an attenuation value to the variable attenuator 119 to be controlled in a sequence (e.g. settings which control the variable attenuator 119 to change to particular attenuation values, for example from a high attenuation value to a low attenuation value).

Figure 7:
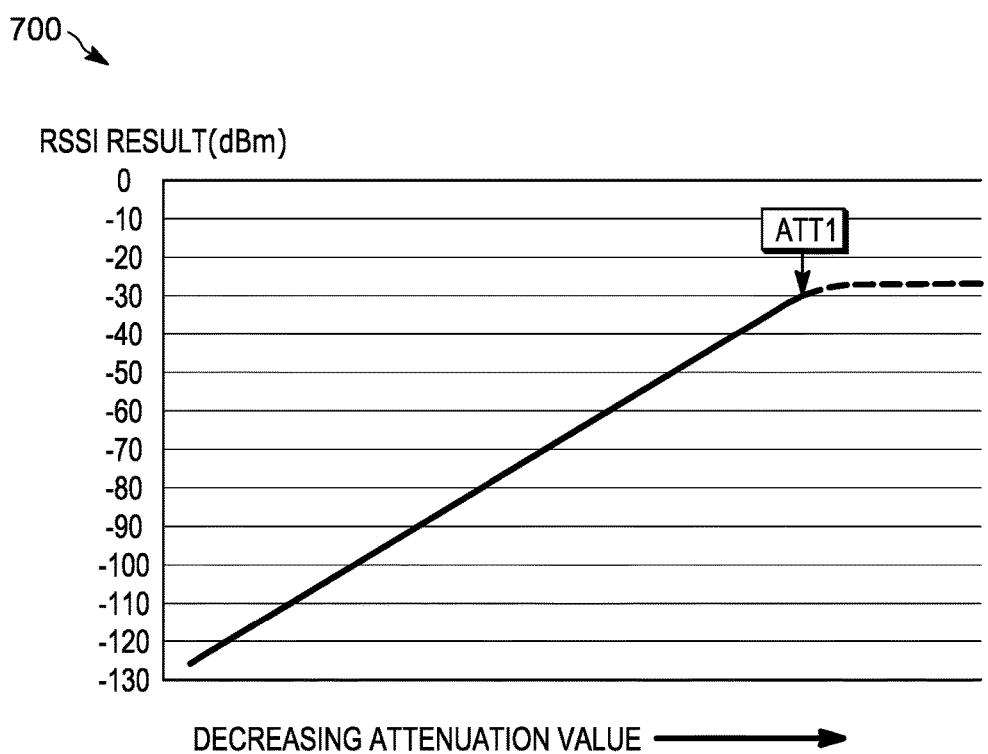
FIG. 7 depicts measured received relative signal strength intensity (e.g. representing a monitor of incoming received power signal level) as a function of an attenuation at an input to the monitoring radio receiver in accordance with some embodiments.

For example, attention is directed to FIG. 7 which depicts an example curve 700 of the measured RSSI 607 (in dBm), measured at the monitoring radio receiver 115, as a function of an attenuation value of the variable attenuator 119. While such measurements are presented respect to received signal strength intensity (e.g. in dBm), any measure of the attenuated input signal level is within the scope of the present specification. Presuming that the attenuation value of the variable attenuator 119 is initially controlled from a large initial value and decreased according the control instructions 605, as the attenuation value decreases, the attenuated input signal increases, and hence the measured RSSI 607 also increases. In other words, while the power received at the receive antenna 117 may be about constant, the measured RSSI 607 changes as the attenuation value of the variable attenuator 119 changes.

With brief reference to FIG. 4, when the attenuated input signal measured RSSI 607 is within the linear region 401 of the dynamic range of monitored radio receiver 115, the measured RSSI 607 changes linearly as the attenuation value decreases; however, when the attenuation value decreases to a value where the attenuated input signal is in the non-linear region 403, the measured RSSI 607 begins to change non-linearly, as represented by the broken line of the curve 700. The controller 120 is hence generally configured to determine an attenuation value ATT1 of the variable attenuator 119 at which the dynamic range of the monitoring radio receiver 115 behaves linearly and/or has a linear response. In other words, when the transmitter TX1 is transmitting (e.g. at maximum power), and the variable attenuator 119 is controlled to the attenuation value ATT1, the monitoring radio receiver 115 behaves linearly, presuming any total background power doesn't increase such that the attenuated input signal increases into the non-linear region 403. A similar process may be used to acquire the background scan 600 in the linear region 401.

In some embodiments, the attenuation value ATT1 may be increased (e.g. by 10%, and the like) to ensure that the dynamic range of the monitoring radio receiver 115 has a linear response when the transmitter TX1 is transmitting; such an increase may reduce the dynamic range of the monitoring radio receiver 115, but decreases the likelihood of the dynamic range of the monitoring radio receiver 115 being at least temporarily pushed into the non-linear region 403, for example due to temporary increases in background power, and the like. Such an increase may further reduce the minimum power level which may be detected by the monitoring radio receiver 115.

Figure 8:
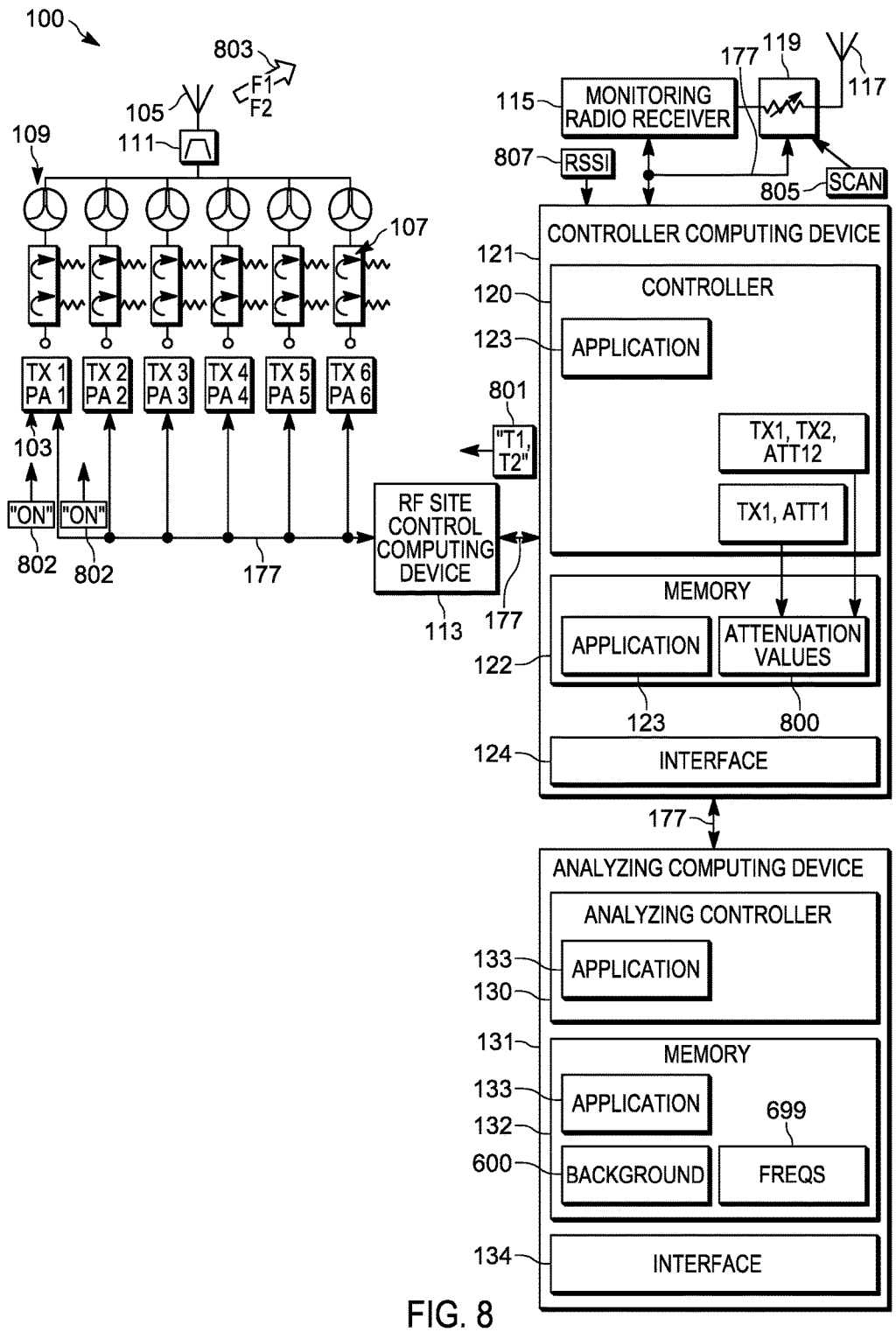
FIG. 8 depicts the system of FIG. 1 in the calibration mode, while calibrating the monitoring radio receiver while two radio transmitters are transmitting in accordance with some embodiments.

Attention is next directed to FIG. 8, which is substantially similar to FIG. 6, with like elements having like numbers. Furthermore, the FIG. 8 depicts an example embodiment of the block 206 of the method 200. In particular, assuming the controller 120 has determined the attenuation value ATT1 of the variable attenuator 119 at which the dynamic range of the monitoring radio receiver 115 behaves linearly and/or has a linear response when the transmitter TX1 is transmitting, the controller 120 stores (e.g. at the block 206 of the method 200) the respective attenuation value ATT1 in association with an identifier "TX1" identifying the transmitter 103 which was transmitting when the respective attenuation value ATT1 was determined; for example, the respective attenuation value ATT1 is stored in association with the identifier "TX1" in a table 800, and the like, of attenuation values that may be generated and/or stored in the memory 122 and/or in any other memory accessible to the controller 120. The attenuation value ATT1 may comprise a resistance value of a variable resistor of the variable attenuator 119, and/or the equivalent (e.g. a value representing a setting of the variable attenuator 119 that results in the dynamic range of the monitoring radio receiver 115 having a linear response).

The controller 120 then continues to implement the blocks 202, 204, 206 for different combinations of the transmitters 103. For example, each of the transmitters TX2, TX3, TX4, TX5, TX6 may be individually controlled to transmit a respective frequency and a respective attenuation value similar to the attenuation value ATT1.

The controller 120 may further control combinations of the transmitters TX1, TX2, TX3, TX4, TX5, TX6 to transmit respective frequencies and a respective attenuation value similar to the attenuation value ATT1 may be determined for each combination. For example, as depicted, the controller 120 is transmitting control instructions 801 to the RF site control computing device 113 to control the pair of transmitters TX1, TX2 to transmit (e.g. at respective maximum powers and/or at respective given powers), for example via control instructions 802; in response, the transmit antenna 105 transmits a signal 803 that includes power at each of respective frequencies F1, F2 of the transmitters TX1, TX2. The controller 120 further controls the variable attenuator 119 to scan through attenuation values via control instructions 805, and measured RSSI 807 is received from the monitoring radio receiver 115 to determine an attenuation value ATT12 at which the dynamic range of the monitoring radio receiver 1115 has a linear response when the transmitters TX1, TX2 are transmitting simultaneously. The controller 120 further stores the attenuation value ATT12 in the table 800 with in association with identifiers "TX1", "TX2" of the transmitters TX1, TX2.

This may be repeated for all possible combinations of the transmitters 103, and/or for combinations of the transmitters 103 that are generally used in when the transmitters 103 are used for channel communication in a communication network.

In yet further embodiments, the table 800 (and the like), may further store the dynamic range of the monitoring radio receiver 115 that occurs for each attenuation value. For example, a first attenuation value determined for one transmitter 103 transmitting may be smaller than a second attenuation value determined for two transmitters 103 transmitting, as the power received at an input to the monitoring radio receiver 115 increases, with the number of transmitters 103 transmitting. Hence, as the attenuation value increases to limit the dynamic range of the monitoring radio receiver 115 to the region 401, the dynamic range also decreases. Such dynamic ranges may be used by the controllers 120, 130 to determine a minimum frequency power that may be determined from scans performed by the monitoring radio receiver 115 at the blocks 310, 314, 316, described in further detail below. In other words, as more transmitters 103 are active, the dynamic range of the monitoring radio receiver 115 may be reduced due to increasing attenuation values of the variable attenuator 119 (e.g. increasing attenuation levels) to accommodate a peak total power received at the receive antenna 117, which may further lead to an increase in a minimum signal level that can be detected.

In yet further embodiments, the transmitters 103 may each be controlled to a similar power during execution of the block 202, for example when each of the transmitters 103 have a similar transmission maximum power (e.g. due to the power amplifiers being similar) and/or a similar transmission given power at which they transmit for channel communications, and the like. In these embodiments, the attenuation values for each of the individual transmitters 103 are generally the same. Similarly, attenuation values for any pair of transmitters 103 are generally the same, as are attenuation values for triplets, quadruplets and quintuplets. Hence, in these embodiments, the attenuation values may be determined for one transmitter 103, one pair of transmitters 103, one triplet of transmitters 103, etc., and stored in the table 800, and the like, as a function of a number of transmitters 103.

Figure 9:
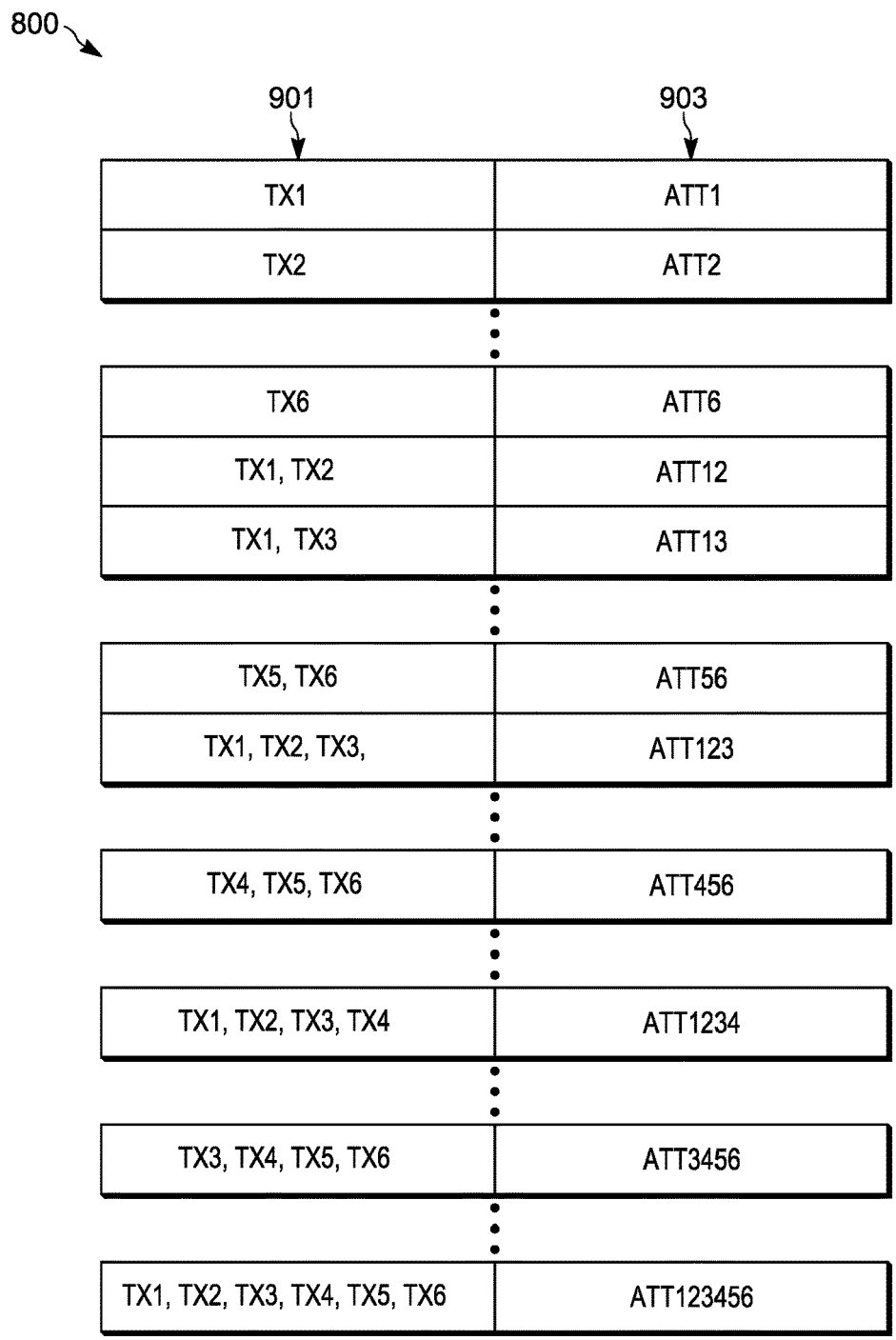
FIG. 9 depicts attenuation values stored in association with transmitter identifiers in accordance with some embodiments.

Attention is next directed to FIG. 9 which depicts an example embodiment of the table 800, presuming that attenuation values for all combinations of the transmitters 103 were determined during execution of the method 200. For example, in rows of a first column 901 are identifiers of various combinations of the transmitters 103, and in the rows, in a second column 903, are the attenuation values determined for each combination of the transmitters 103. Hence, for example, the attenuation value for the transmitter TX2 is ATT2, the attenuation value for the combination of the transmitters TX1, TX3 is ATT13, the attenuation value for the combination of the transmitters TX1, TX2, TX3 is ATT123, etc., with attenuation values stored for all combinations of pairs, triplets, quadruplets, quintuplets of the transmitters 103, as well as an attenuation value ATT123456 for all the transmitters 103. However, as described above, not all attenuation values for all combinations of the transmitters 103 need to be stored in the table 800; rather attenuation values may be stored only for combinations of the transmitters 103 that are generally used in when the transmitters 103 are used for channel communication in a communication network.

Furthermore, attenuation values and associated transmitter identifiers may not be stored in a table, but rather may be stored any suitable format, including, but not limited to, a database format.

Furthermore, an attenuation value used to acquire the background scan 600 may be stored in the memory 122 (e.g. in table 800).

Regardless of format, when the method 200 is executed, the memory 122 (which is accessible by the controller 120), stores respective attenuation values for the variable attenuator 119 in association with identifiers of the one or more radio transmitters 103 which were transmitting when the respective attenuation values were determined. Alternatively, and/or in addition to, the respective attenuation values and associated identifiers of the transmitters 103 may be stored at the memory 132, and/or another memory accessible to the controller 120.

Figure 10:
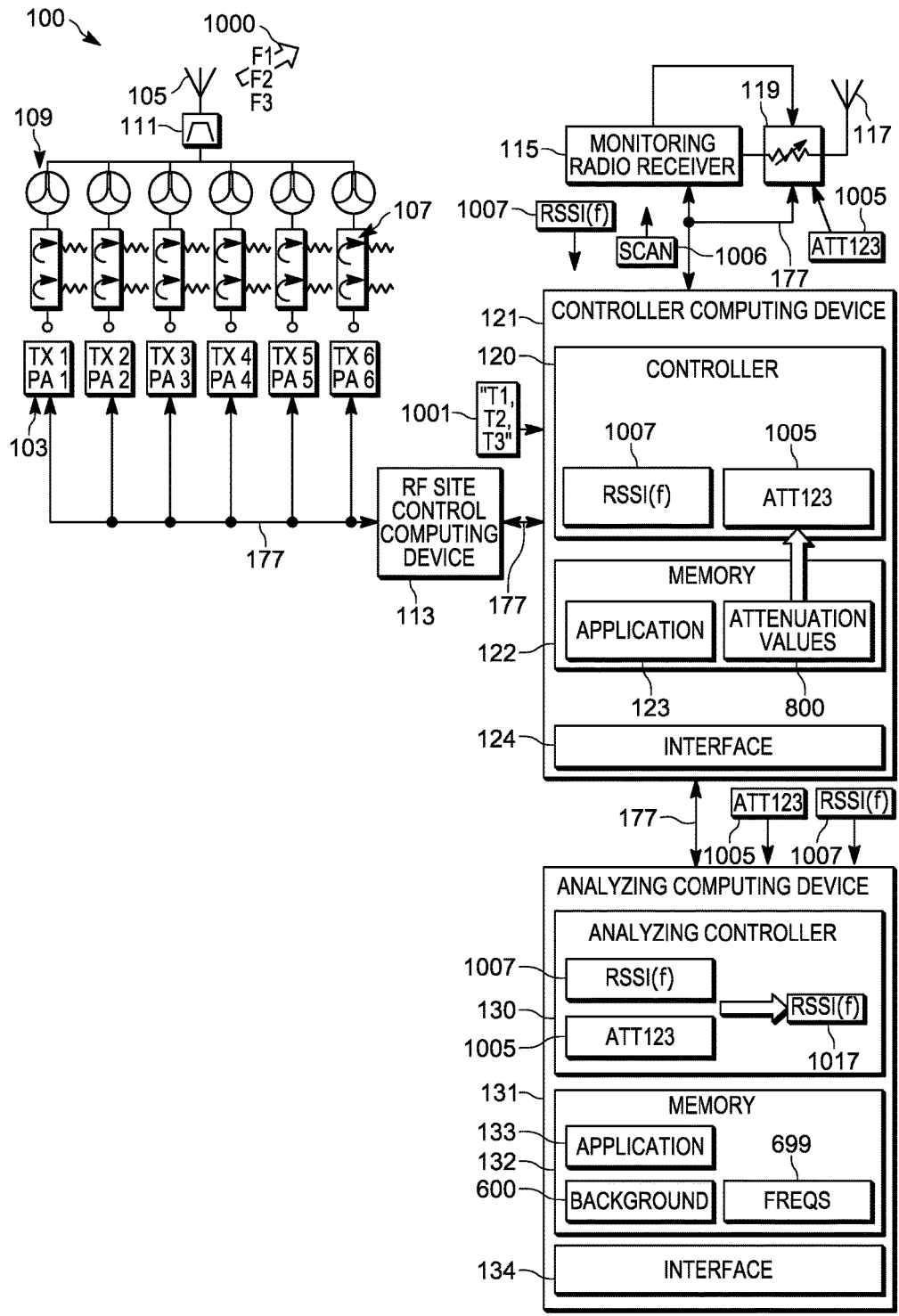
FIG. 10 depicts the system of FIG. 1 performing an evaluation of the radio-frequency site in accordance with some embodiments.

Attention is next directed to FIG. 10, which is substantially similar to FIG. 8, with like elements having like numbers. In particular, FIG. 10 depicts an example embodiment of the blocks 302, 304, 306, 308, 310 of the method 300. The controller 120 is executing the application 123 and the analyzer controller 130 is executing the application 133.

As depicted, the RF site controller computing device 113 has controlled three of the transmitters 103, and specifically the transmitters TX1, TX2, TX3, to transmit, for example at respective frequencies F1, F2, F3, for example on respective channels, such that the transmit antenna 105 is transmitting one or more signals 1000 at the frequencies F1, F2, F3. As depicted, the controller 120 identifies (e.g. at the block 302 of the method 300) the one or more radio transmitters 103 which are currently transmitting by receiving identifiers of the transmitters TX1, TX2, TX3 in data 1001 received from the RF site control computing device 113, which may be requested by the controller 120 and/or sent by the RF site control computing device 113 when the transmitters 103, that are transmitting, changes.

The controller 120 selects the attenuation value 1005 (e.g. the attenuation value ATT123) from the memory 122 (e.g. from the table 800) which corresponds to the one or more radio transmitters 103 which are currently transmitting (e.g. the transmitters TX1, TX2, TX3). Alternatively, the attenuation value 1005 may be selected by the controller 120 based on a number of the one or more radio transmitters 103 that are currently transmitting. Either way, the attenuation value 1005 is an attenuation value where a dynamic range of the monitoring radio receiver 115 has a linear response for total power received at the receive antenna 117, as determined, for example, using the method 200, as determined when the transmitters TX1, TX2, TX3 were transmitting, for example at a maximum power.

The controller 120 controls (e.g. at the block 304 of the method 300) the variable attenuator 119 to the attenuation value 1005, for example, by transmitting the attenuation value 1005 to the variable attenuator 119 (e.g. in a control instruction). Hence, when the variable attenuator 119 is controlled to the attenuation value 1005, the dynamic range of the monitoring radio receiver 115 has a linear response.

The controller 120 further controls (e.g. at the block 306 of the method 300) the monitoring radio receiver 115 to scan at least currently active frequencies F1, F2, F3 of the one or more radio transmitters 103, for example using a control instruction 1006. The control instructions 1006 may include one or more ranges of frequencies to scan that include at least currently active frequencies F1, F2, F3. In some embodiments, the currently active frequencies F1, F2, F3 are provided to the controller 120 by the RF site control computing device 113 with the data 1001. In other embodiments, respective frequencies at which each of the transmitters 103 transmit may be stored at the memory 122 (and/or the memory 132), for example in the application 123 (and/or the application 133), and retrieved using the identifiers of the transmitters 103 received in the data 1001.

Furthermore, as two or more of the transmitters 103 are transmitting, a "YES" decision occurs at the block 308 of the method 300, and the controller 120 controls (e.g. at the block 310 of the method 200) the monitoring radio receiver 115 to scan intermodulation frequencies associated with the currently active frequencies F1, F2, F3 of the two or more radio transmitters 103 that are currently transmitting. For example, the range of frequencies to scan in the control instructions 1006 may include the intermodulation frequencies. The controller 120 may determine intermodulation frequencies of the transmitters TX1, TX2, TX3 using the frequencies F1, F2, F3. Alternatively, as described above, the intermodulation frequencies of the transmitters TX1, TX2, TX3 may be predetermined and stored at the memory 122 and/or the memory 132, in the data 699, and retrieved using the identifiers of the transmitters 103 received in the data 1001.

As depicted, the controller 120 receives a scan 1007, for example of measured RSSI as a function of frequency, from the monitoring radio receiver 115, which, as depicted, is provided to the analyzing controller 130 for analysis. As depicted, the attenuation value 1005 is also provided to the analyzing controller 130 such that the analyzing controller 130 may adjust the measured RSSI in the scan 1007 to a pre-attenuation RSSI, for example in an adjusted scan 1017.

Figure 11:
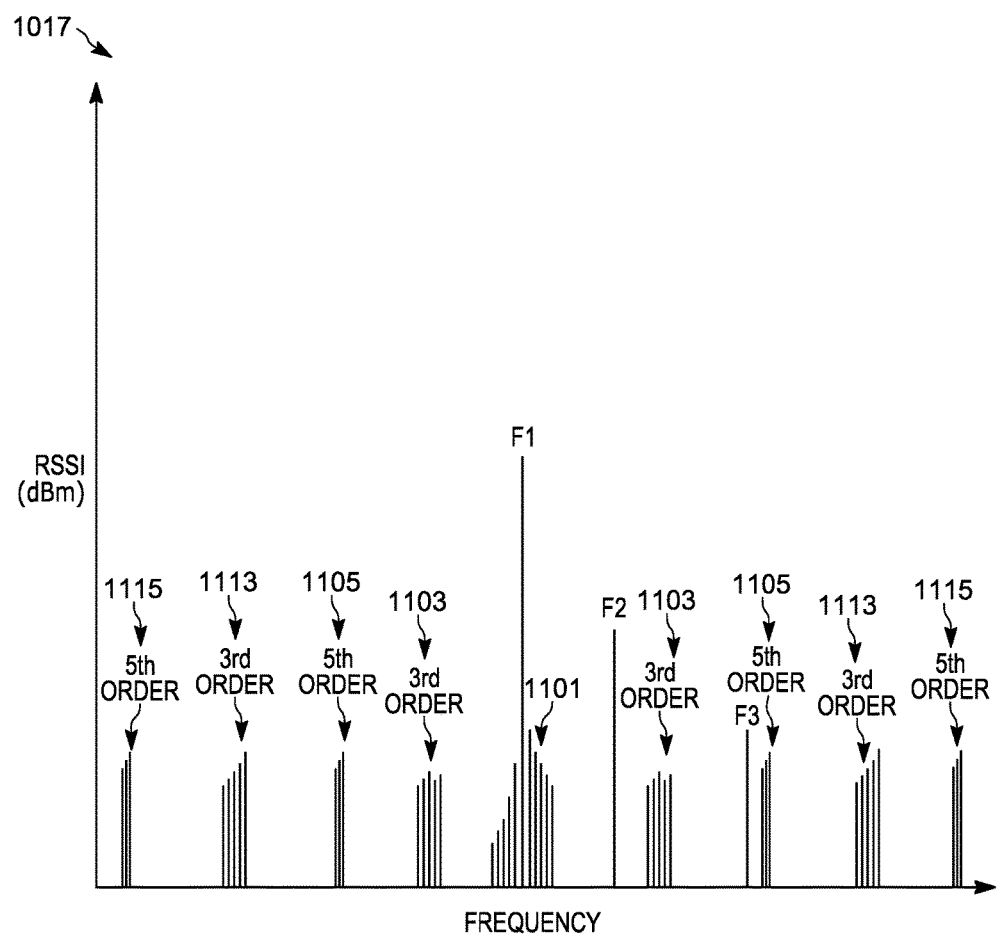
FIG. 11 depicts an example scan acquired during an evaluation of the radio-frequency site, the scan being of a range of frequencies that includes at least the frequencies emitted by three transmitters as well as intermodulation frequencies in accordance with some embodiments.

Attention is next directed to FIG. 11 which depicts an example scan 1017 of a range of frequencies that includes at least the frequencies F1, F2, F3, as well as intermodulation frequencies.

For example, as depicted, the scan 1017 includes RSSI measured by the monitoring radio receiver 115, adjusted to pre-attenuation RSSI values using the attenuation value 1005.

In some embodiments, the background scan 600 is subtracted from the scan 1017 (e.g. after adjusting the background scan 600 using the associated attenuation value). However, the background scan 600 may also not be subtracted, though may be used to identify frequencies in the scan 1017 that correspond to existing background frequencies. For clarity, however, such existing background frequencies are not depicted in the scan 1017.

As depicted, a portion 1101 of the scan 1017 that includes the frequency F1 includes artifacts associated with, for example, an unstable power amplifier, a failing cavity filter, and the like. The frequencies F2, F3 do not include such artifacts.

Furthermore, the scan 1017 includes: 3rd order intermodulation frequencies and $5^{th}$ order intermodulation frequencies in regions 1103, 1105, respectively, that may be due to intermodulation between the frequencies F1, F2; and 3rd order intermodulation frequencies and $5^{th}$ order intermodulation frequencies in regions 1113, 1115, respectively, that may be due to intermodulation between the frequencies F1, F3. In the depicted example, no intermodulation frequencies associated with frequencies F2, F3 are in the scan 1017.

Figure 12:
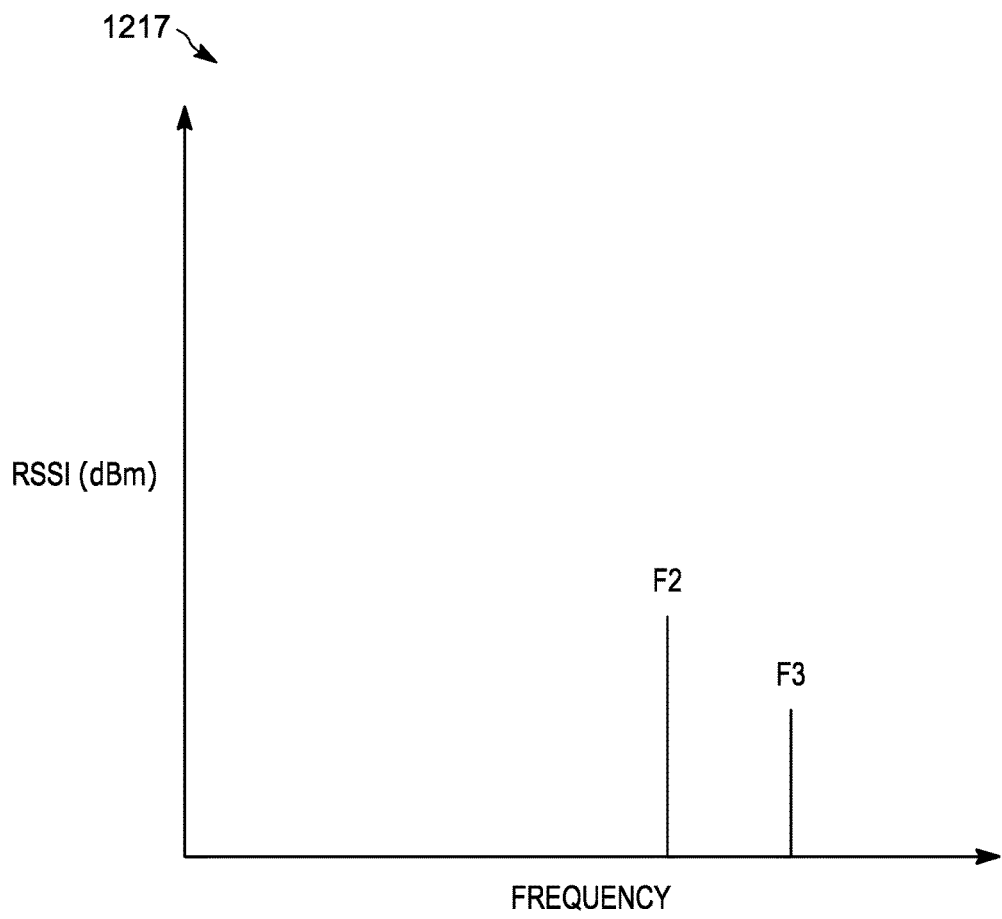
FIG. 12 depicts an example scan acquired during an evaluation of the radio-frequency site, the scan being of a range of frequencies that includes at least the frequencies emitted by two transmitters in accordance with some embodiments.

Attention is next directed to FIG. 12, which depicts a scan 1217 of the same range of frequencies as the scan 1017, however the scan 1217 was performed when only the transmitters TX2, TX3 were transmitting at the respective frequencies F2, F3 (and when the variable attenuator 119 was controlled to an attenuation value ATT23 where a dynamic range of the monitoring radio receiver 115 has a linear response for total power received at the receive antenna 117, as determined, for example, using the method 200, as determined when the transmitters TX2, TX3 were transmitting, for example at a maximum power). The controller 130 may compare the scans 1017, 1217 (e.g. at the block 318 of the method 300) and determine that: when the transmitter TX1 is not transmitting, there are no intermodulation frequencies; and hence the transmitter TX1 is failing and/or having technical problems. Alternatively, and assuming that the controller 120 acquires further scans at the monitoring radio receiver 15 when the transmitters TX1, TX2, TX3 are transmitting, as a function of time, the analyzer controller 130 may compare the scans to (e.g. at the block 318 of the method 300) to determine whether the intermodulation frequencies and/or the artifacts in the portion 1101 change, as a function of time.

Figure 13:
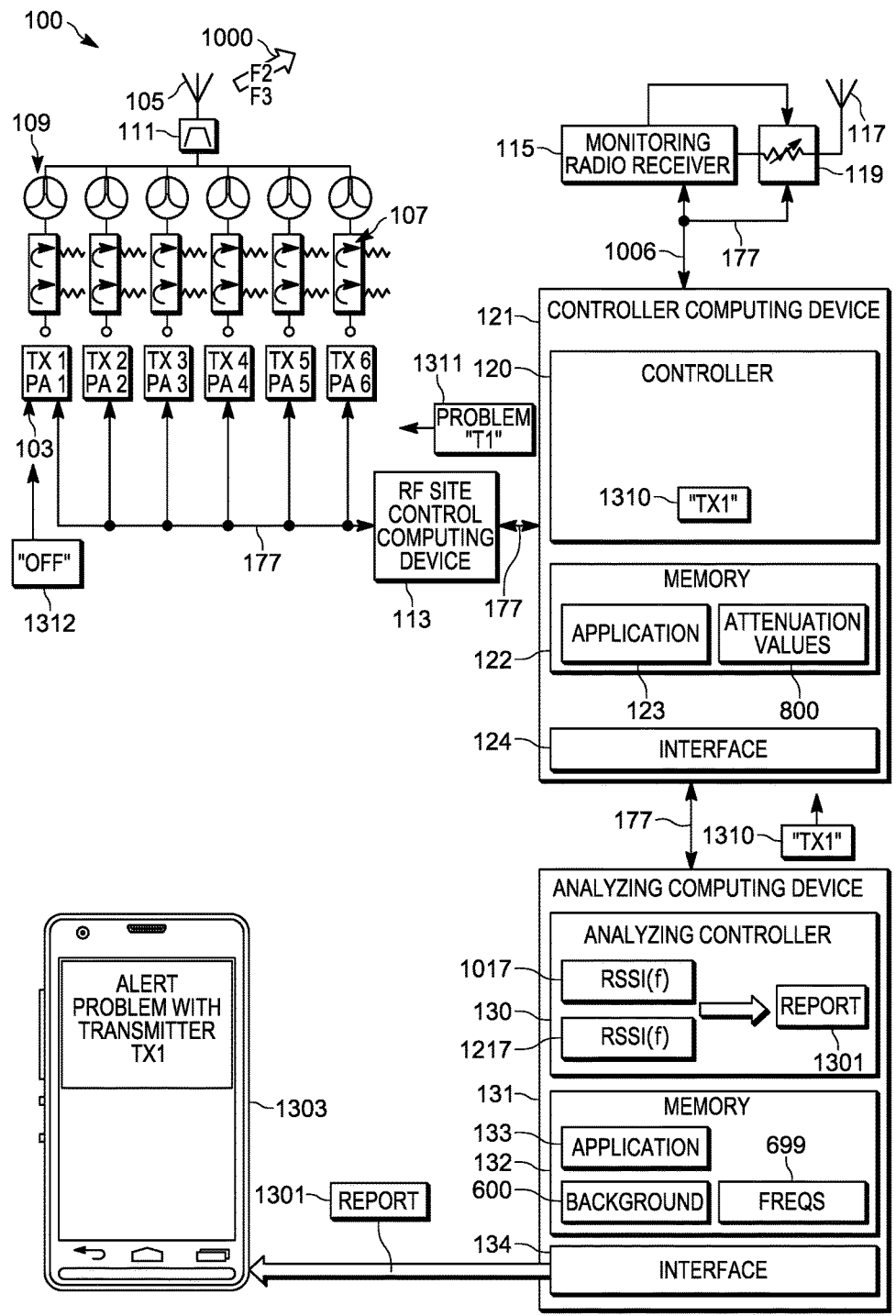
FIG. 13 depicts the system of FIG. 1 generating a report of problems found during an evaluation of the radio-frequency site, as well as initiation of remedial action in accordance with some embodiments.

Attention is next directed to FIG. 13 which depicts an example embodiment of the blocks 318, 320 of the method 300. In particular, the analyzer controller 130 is analyzing the scans 1017, 1217 and generating a report 1301, which is transmitted to a communication device 1303, for example of an administrator of the system 100. The report 1301 may be transmitted as an email, a text message, an automated phone call, and the like. The report 1301 generally includes text and/or an indication that a problem has been found with the transmitter TX1. Put another way, the report 1301 is provided to the communication device 1303 to initiate remedial action to address the detected problem with the transmitter TX1. The administrator may then cause the transmitter TX1 to be serviced and/or shut off. Alternatively, the report 1301 may be transmitted to a communication device of a service shop, and the like, to cause a service person, and the like to service and/or replace the transmitter TX1.

In some embodiments, the report 1301 may include a notification of degradation of the transmitter TX1, so that such degradation may be addressed prior to actual failure of the transmitter TX1 and/or prior to non-compliance of the transmitter TX1 with regulatory requirements. Indeed, in some embodiments, the analyzer controller 130 may compare parameters of the transmitter TX1, as determined using the scans 1017, 1417 and/or further scans as a function of time, with regulatory requirements and determine that the transmitter TX1 is degrading with respect to the regulatory requirements. Such determination may be included in the report 1301. Indeed, the analyzer controller 130 may further estimate when the transmitter TX1 may cease to meet regulatory requirements, for example by extrapolating extracted parameters from the scans 1017, 1417 and/or further scans as a function of time.

Alternatively, the analyzer controller 130 may initiate a fully automated remedial action to turn off the transmitter TX1 and/or prevent the transmitter TX1 from being used. For example, as depicted, the analyzer controller 130 transmits an identifier 1310 of the transmitter TX1 to the controller 120, which in turn transmits a control instruction 1311 to the RF site control computing device 113 to instruct the RF site control computing device 113 to turn off the transmitter TX1 and/or prevent the transmitter TX1 from being used. For example, as depicted, the RF site control computing device 113 transmits control instructions 1312 to the transmitter TX1 to turn off the transmitter TX1 (presuming the transmitter TX1 is on), and otherwise uses other transmitters 103 to transmit data in communication channels; indeed one or more of the other transmitters 103 may be controlled to the frequency F1 to transmit data on a channel associated with the frequency F1.

Alternatively, channel assignments to the transmitters 103 may be prioritized, for example to assign higher priority channels to the transmitters TX2, TX3, TX4, TX5, TX6, and assign lower priority channels to the transmitter TX1 as the transmitter TX1 has a greater chance of failure than the transmitters TX2, TX3, TX4, TX5, TX6. Such prioritization of channels may occur at the RF control computing device 113 and/or in conjunction with communication devices (not depicted) over which channel communication is occurring using the transmitters 103. For example, such channel communication may occur in talkgroups, and higher priority talkgroup channel communication may occur via the transmitters TX2, TX3, TX4, TX5, TX6, while lower priority talkgroup channel communication may occur via the transmitter TX1.

Figure 14:
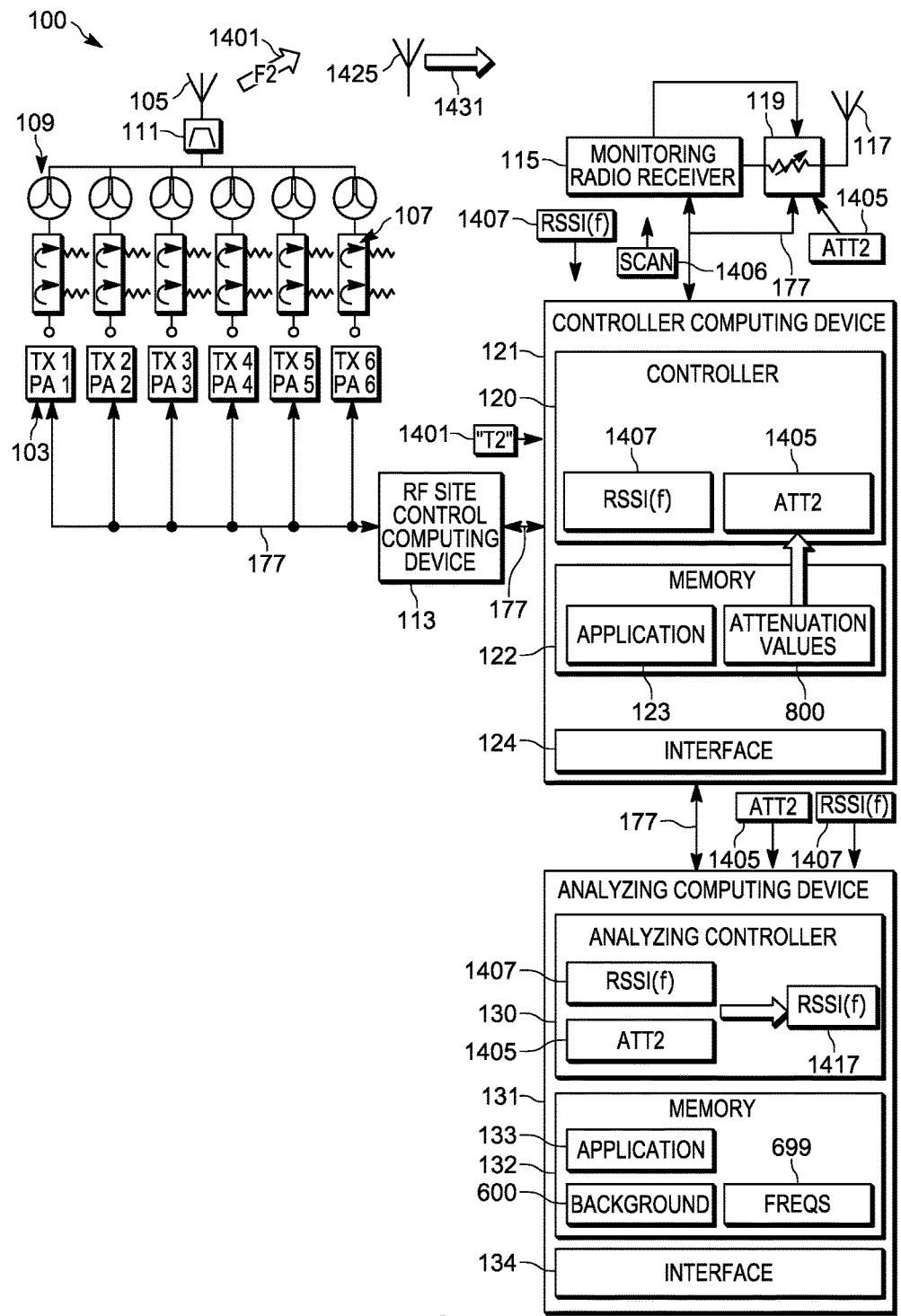
FIG. 14 depicts the system of FIG. 1 performing a further evaluation of the radio-frequency site in accordance with some embodiments.

Attention is next directed to FIG. 14, which is substantially similar to FIG. 10, with like elements having like numbers. However, in FIG. 14, the RF site controller computing device 113 has controlled one of the transmitters 103, and specifically the transmitter TX2, to transmit, for example at a frequency F2, for example on a respective channel, such that the transmit antenna 105 is transmitting one or more signals 1401 at the frequency F2. The controller 120 identifies the one or more radio transmitters 103 which are currently transmitting by receiving data 1401 that includes the identifier "TX2" (e.g. and is otherwise, similar to the data 1001), and selects the attenuation value 1405 (e.g. the attenuation value ATT2) from the memory 122 which corresponds to the one or more radio transmitters 103 which are currently transmitting (e.g. the transmitter TX2). The controller 120 controls the variable attenuator 119 to the attenuation value 1405, and further controls the monitoring radio receiver 115 to scan at least the currently active frequency F2 of the one or more radio transmitters 103, for example using a control instruction 1406. The resulting scan 1407 is received, and provided to the analyzing controller 130, with the attenuation value 1405 to produce an adjusted scan 1417.

Hence, FIG. 14 is similar to FIG. 10, with only one transmitter 103 transmitting, specifically the transmitter TX2. However, in contrast to FIG. 10, a further transmit antenna 1425 has been placed in the vicinity of the RF site of the system 100, for example as part of a new adjacent RF site, and/or as part of an attempt to jam the RF site of the system 100, and the like. Regardless, the transmit antenna 1425 is transmitting a signal 1431 that is detectable at the monitoring radio receiver 115. While not depicted it is assumed that the transmit antenna 1425 is in communication with one or more respective transmitters.

Figure 15:
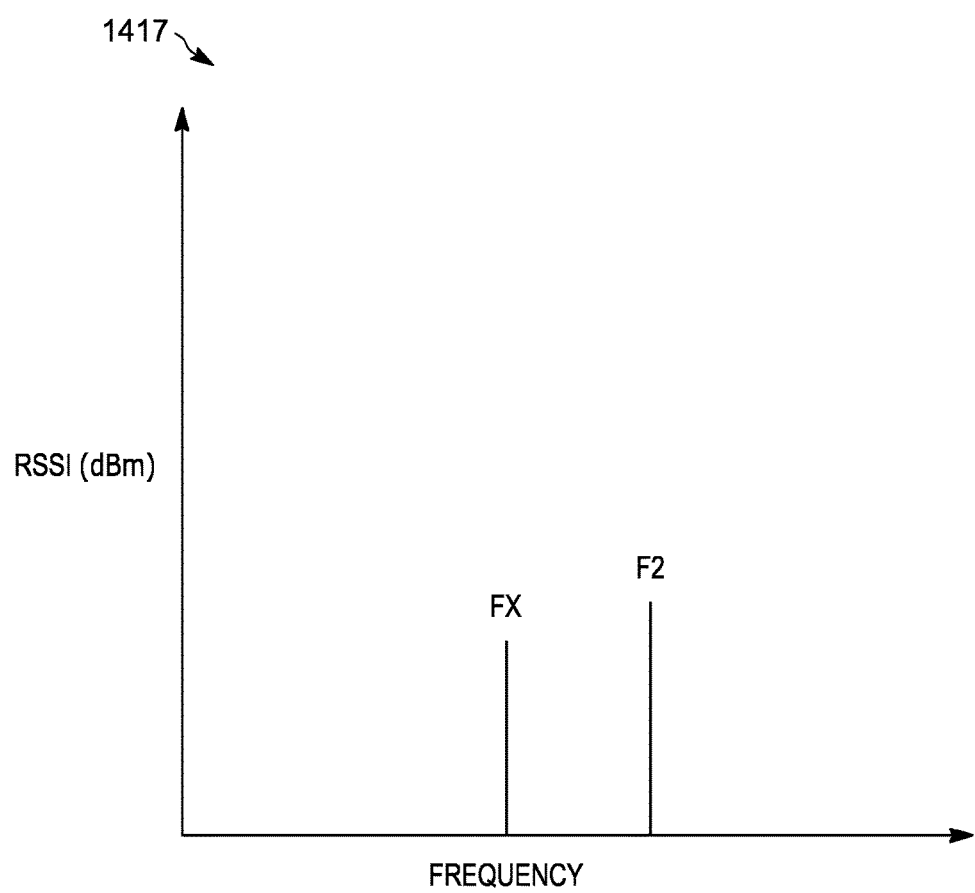
FIG. 15 depicts an example scan acquired during the further evaluation of the radio-frequency site, the scan including an unexpected frequency in accordance with some embodiments.

Attention is next directed to FIG. 15 which depicts the scan 1417, that includes the frequency F2 and a frequency FX, which may be due to the signal 1431. The controller 130 may determine that the frequency FX is an unexpected frequency, as the frequency FX doesn't correspond to the frequency F2; if two or more transmitters 103 were transmitting, controller 130 may determine that the frequency FX is an unexpected frequency when the frequency FX doesn't correspond to intermodulation frequencies of the two or more transmitters 103. The controller 130 may further determine that the frequency FX is an unexpected frequency when the frequency FX does not occur in the background scan 600.

The frequency FX may be either a frequency in the signal 431, or an intermodulation frequency of a frequency in the signal 431 combined with the frequency F2.

Figure 16:
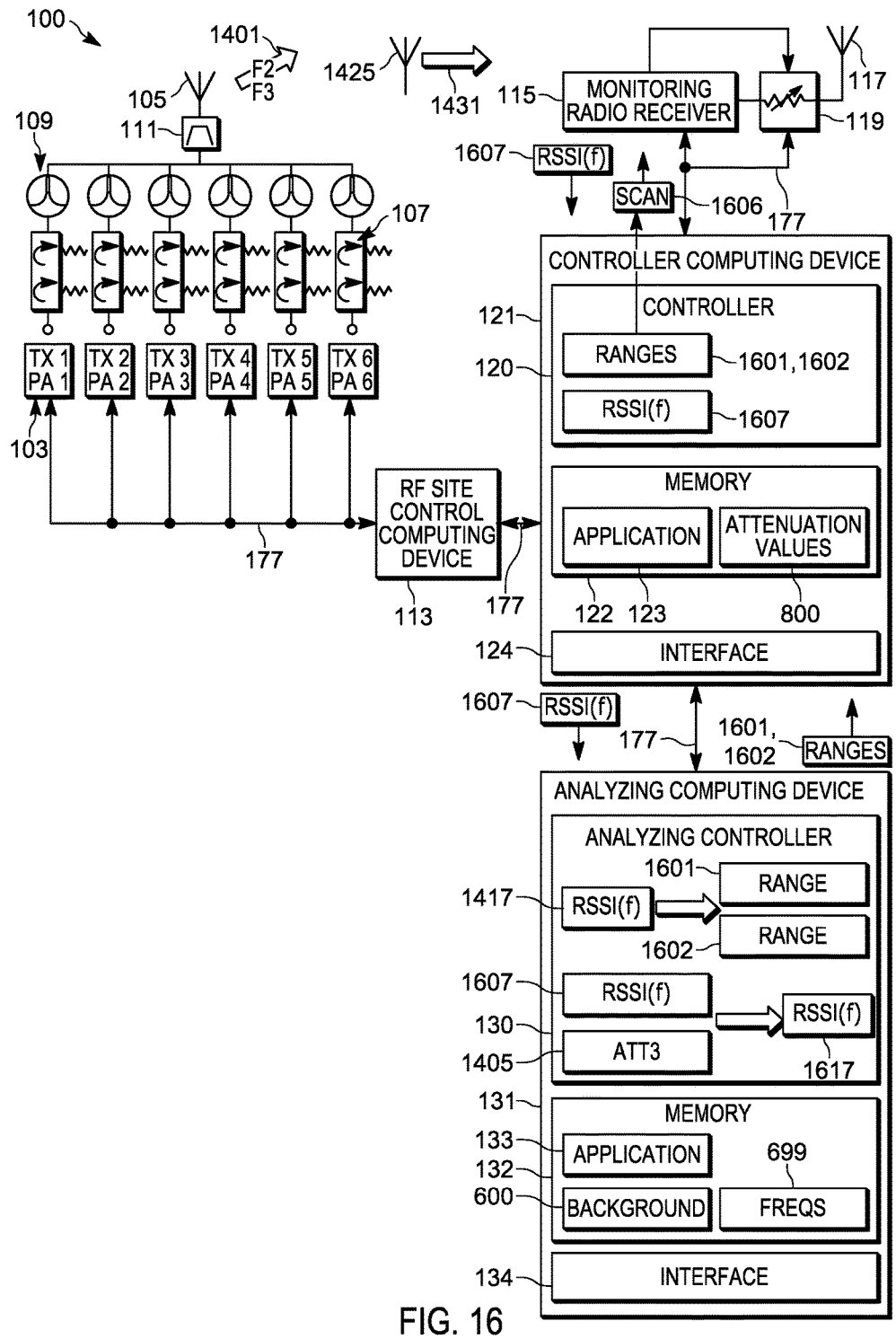
FIG. 16 depicts the system of FIG. 1 performing a further scan of intermodulation frequencies associated with combinations of one or more unexpected frequencies and currently active frequencies and of frequencies that, when combined with the currently active frequencies, would cause one or more intermodulation frequencies at the one or more unexpected frequencies.

Attention is next directed to FIG. 16, which is substantially similar to FIG. 14 with like elements having like numbers. However, in FIG. 16, the analyzer controller 130 determines, from the scan 1417, a range 1601 of frequencies that includes intermodulation frequencies associated with combinations of the one or more unexpected frequencies FX and the currently active frequency F2. As also depicted in FIG. 16, the analyzing controller 130 determines, from the scan 1417, a range 1602 of frequencies that includes frequencies that, when combined with the currently active frequency F2 would cause one or more intermodulation frequencies at the one or more unexpected frequencies FX.

The analyzing controller 130 provides the ranges 1601, 1602 to the controller 120, which controls the monitoring radio receiver 115 to scan the ranges 1601, 1602, for example in a control instruction 1606. The control instruction 1606 may include instructions to scan the ranges 1601, 1602, as well as the range that includes the frequencies F2, FX. Hence, for example, FIG. 16 also depicts an example embodiment of the blocks 312, 314, 316 of the method 300. In particular, unexpected frequencies may be detected at the block 312 by the analyzing controller 130 and/or by way of the controller 120 receiving the ranges 1601, 1602.

The controller 120 may then control (e.g. at the block 314), the monitoring radio receiver 115 to scan intermodulation frequencies (e.g. in the range 1601) associated with combinations of the unexpected frequency FX and the currently active frequency F2. Similarly, the controller 120 may then control (e.g. at the block 316), the monitoring radio receiver 115 to scan frequencies (e.g. in the range 1602) that, when combined with the currently active frequency F2, would cause one or more intermodulation frequencies at the unexpected frequency FX. It is assumed that the variable attenuator 119 remains at the attenuation value 1405 of ATT2.

As depicted, the scan 1607 that includes the ranges 1601, 1602 is received from the monitoring radio receiver 115. The scan 1607 is provided to the analyzing controller 130 which generates an adjusted scan 1617 using the attenuation value 1405.

Figure 17:
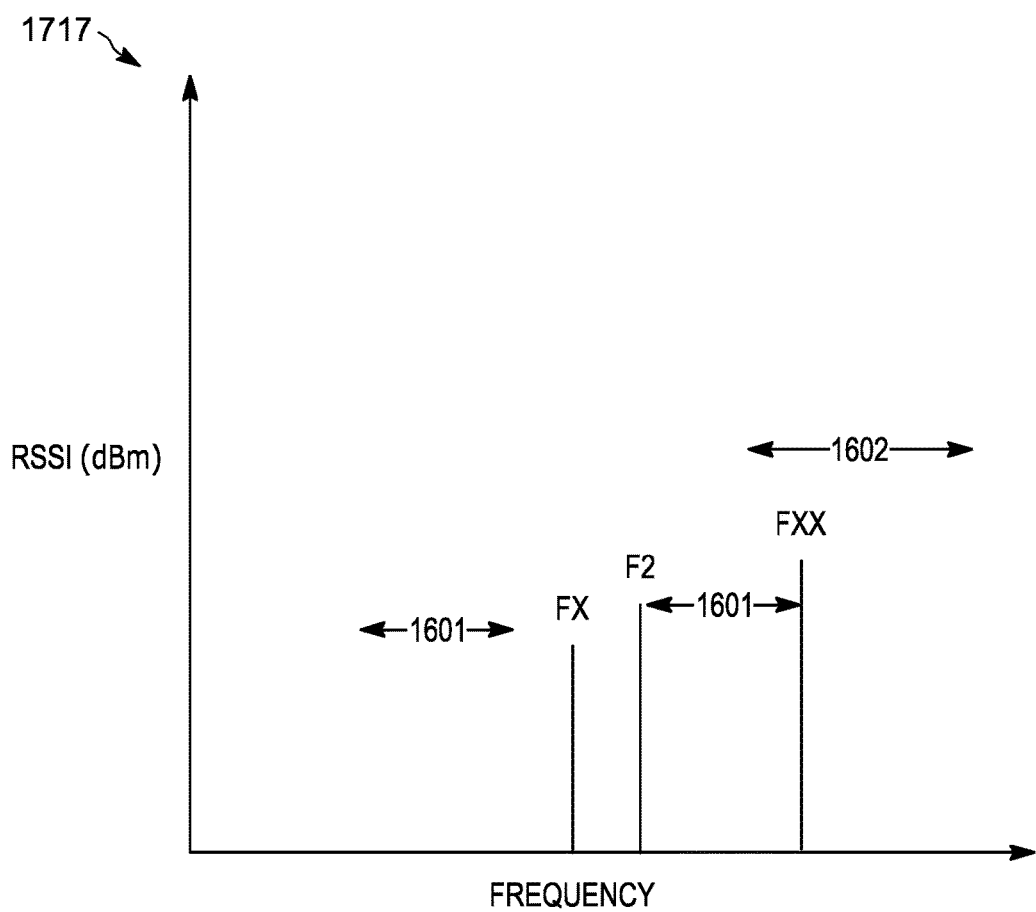
FIG. 17 depicts the scan of the intermodulation frequencies associated with combinations of one or more unexpected frequencies and currently active frequencies and of the frequencies that, when combined with the currently active frequencies, would cause one or more intermodulation frequencies at the one or more unexpected frequencies.

Attention is next directed to FIG. 17 which depicts an example of the adjusted scan 1617, which includes the frequencies F2, FX, as well as the ranges 1601, 1602. For example, as depicted, the scan 1617 includes a further frequency FXX in the range 1602, but no further frequencies in the range 1601 (which includes two ranges 1602 on either side of the combination of the frequencies F2, FX). As such, when the analyzing controller 130 analyzes the scan 1617, the analyzing controller 130 may determine that the unexpected frequency FX is an intermodulation frequency associated with the combination of the frequency F2 and the further frequency FXX. Such a conclusion may be reached as the further frequency FXX is located in the range 1602 that includes frequencies that, when combined with the currently active frequency F2 would cause intermodulation frequencies at the unexpected frequency FX. Similarly, such a conclusion may also be reached as there are no further frequencies in the range 1601 that includes intermodulation frequencies associated with a combination of the unexpected frequency FX and the currently active frequency F2.

As such, the analyzing controller 130 may generate a report, similar to the report 1301, and transmit the report to the communication device 1303 to notify an administrator of the system 100 of the appearance of a new signal, and/or at the further frequency FXX; alternatively, the report may notify an administrator of the system 100 of the appearance of a unexpected transmitter, for example that is producing the further frequency. Put another way the analyzing controller 130 may be configured to generate and/or provide a report indicative of one or more of newly detected unexpected frequencies and newly detected unexpected transmitters, It is furthermore understood that in executing the blocks 310, 314, 316, the controllers 120, 130 may further control the monitoring radio receiver 115 to scan for intermodulation frequencies associated with the combinations of background frequencies (e.g. as measured in the background scan 600) and one or more of currently actively frequencies of the transmitters 103, and/or unexpected frequencies.

It is furthermore understood that unexpected frequencies may be time dependent, for example when the unexpected frequencies are due to nearby RF sites of telecommunication entities and the like. Such time dependency may be determined by the analyzer controller 130 executing the block 318 of the method 300. Furthermore, channel prioritization may occur at the transmitters 103, as described above, when time dependent interaction and/or interference occurs between one or more frequencies of the transmitters 103 and the unexpected frequencies.

It is furthermore understood that other types of behaviour may be tracked at the block 318 of the method 300, including, but not limited to, decay and/or degrading of power of one or more frequencies of a transmitter 103 over time, which may be indicative of power amplifier degradation and/or failure.

In this manner, problems at the system 100 may be detected prior to outright failure of a transmitter 103 and/or associated equipment, as behavior of individual transmitter 103 and/or combinations of transmitters 103 are tracked as a function of time.

The method 200 and the method 300 may be implemented in other types of RF sites. For example, attention is next directed to FIG. 18, which depicts a system 1800 that comprises an RF site that includes a plurality of radio transmitters 1803, labelled TX1, TX2, TX3, TX4, TX5, TX6, coupled to a transmit antenna 1805 via a transmitter multi-coupler 1807 and a bandpass filter 1811. The transmitter multi-coupler 1807 generally combines frequencies from each of the transmitter 1803 for transmission by the transmit antenna 1805, the bandpass filter 1811 configured to filter unwanted frequencies, such as harmonics, and the like. Furthermore, the transmitter multi-coupler 1807 generally relies on pre-distortion and feed forward circuits as well as linear power amplifier, for example to meet FCC and ETSI standards.

The system 1800 further comprises a plurality of radio receivers 1815, labelled RX1, RX2, RX3, RX4, RX5, TX6, coupled to a receive antenna 1817 via variable attenuators 1819, a receiver multi-coupler 1828 and a bandpass filter 1829, the receiver multi-coupler 1828 configured to provide respective received frequencies to the radio receivers 1815, and the bandpass filter 1829 configured to filter unwanted frequencies, such as harmonics, and the like.

The system 1800 further comprises a controller 1830, which is component of a computing device 1831. The computing device 1831 may have similar functionality of the computing devices 113, 121, 131, and the controller 1830 may have similar functionality of the controllers 120, 130. Hence, functionality of the computing device 1831 and/or the controller 1830 may distributed between a plurality of computing devices and/or controllers, with only the computing device 1831 and the controller 1830 depicted for simplicity.

As depicted, the computing device 1831 is in communication with the transmitters 1803, the receivers 1815 and the variable attenuators 1819 (though a link to only one variable attenuator 1819 is depicted for simplicity). In general, the transmitters 1803, the receivers 1815 are used for channel communications in the system 1800, similar to the transmitters 103 of the system 100. Furthermore, each of the variable attenuators 1819 is controllable by the controller 1830, similar to the controller 120 controlling the variable attenuators 119. As such, the controller 1830 may execute the method 200 in conjunction with one or more of the receivers 1815 and determine and store attenuation values where a dynamic range of a respective radio receiver has a linear response for total power received at the receive antenna 1817, such attenuation values being similar to the attenuation values stored in the table 800.

The controller 1830 may further execute the method 300 for receivers 1815 that are not presently being used for channel communications. However, when a receiver 1815 is being controlled for channel communication (e.g. when communication data is being received at the receive antenna 1817), a respective variable attenuator 119 is controlled to an attenuation value of zero, and the like (and/or a lowest attenuation value).

Otherwise, one or more of the receivers 1815 may be used as a monitoring radio receiver, similar to the monitoring radio receiver 115, by controlling a respective variable attenuator 1819 to an attenuation value where a dynamic range of the respective radio receiver 1815 has a linear response for total power received at the receive antenna 1817. Hence, one or more of the receivers 1815 may be controlled to perform scans to evaluate the RF site of the system 1800. Such may be similar to the scans 1017, 1217, 1417, 1717, and the like and may be used to identify problems at the transmitters 1803, similar to the problems described above with respect to the system 100. However, in the system 1800, such problems may include problems at the transmitter multi-coupler 1807.

Provided herein is a system for monitoring and/or evaluating a radio-frequency site, which may provide notifications of degradation so that it may be addressed prior to actual failure and/or non-compliance with regulatory requirements. By monitoring transmitters of an RF site, with specific adjustment of an input signal to monitoring radio transmitter using a variable attenuator, to ensure that the dynamic range of the monitoring radio transmitter has a linear response, the precise behavior of the RF site may be monitored over time.

In the foregoing specification, specific embodiments have been described. However, one of ordinary skill in the art appreciates that various modifications and changes may be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

In this document, language of "at least one of X, Y, and Z" and "one or more of X, Y and Z" may be construed as X only, Y only, Z only, or any combination of two or more items X, Y, and Z (e.g., XYZ, XY, YZ, ZZ, and the like). Similar logic may be applied for two or more items in any occurrence of "at least one . . . " and "one or more . . . " language.

Moreover, in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

It will be appreciated that some embodiments may be comprised of one or more generic or specialized processors (or "processing devices") such as microprocessors, digital signal processors, customized processors and field programmable gate arrays (FPGAs) and unique stored program instructions (including both software and firmware) that control the one or more processors to implement, in conjunction with certain non-processor circuits, some, most, or all of the functions of the method and/or apparatus described herein. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used.

Moreover, an embodiment may be implemented as a computer-readable storage medium having computer readable code stored thereon for programming a computer (e.g., comprising a processor) to perform a method as described and claimed herein. Examples of such computer-readable storage mediums include, but are not limited to, a hard disk, a CD-ROM, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory) and a Flash memory. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it may be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separately claimed subject matter.

We claim:

1. A system comprising:
   a radio-frequency site control computing device;
   one or more radio transmitters in communication with one or more transmit antennas located at a radio-frequency site, the one or more radio transmitters under control of the radio-frequency site control computing device;
   a monitoring radio receiver in communication with a receive antenna through a variable attenuator;
   a memory storing respective pre-determined attenuation values for the variable attenuator in association with respective identifiers of the one or more radio transmitters which were transmitting when the respective attenuation values were determined, each of the respective pre-determined attenuation values for controlling the variable attenuator to a respective attenuation value where the monitoring radio receiver has a linear response for total power received at the receive antenna; and a controller in communication with the radio-frequency site control computing device, the one or more radio transmitters, the monitoring radio receiver and the variable attenuator, and the memory, the controller configured to:

receive, from the-frequency site control computing device, identifiers of the one or more radio transmitters which are currently transmitting;

select, using the identifiers of the one or more radio transmitters which are currently transmitting, an attenuation value from the memory which corresponds to the one or more radio transmitters which are currently transmitting;

responsively control the variable attenuator to the attenuation value where a dynamic range of the monitoring radio receiver has a linear response for the total power received at the receive antenna; and, thereafter, control the monitoring radio receiver to scan at least currently active frequencies of the one or more radio transmitters.

2. The system of claim 1, wherein the controller is further configured to calibrate the variable attenuator by:

sequentially controlling, via the radio-frequency site control computing device, the one or more radio transmitters to transmit, at one or more of a respective maximum power level and a given power level, at one or more given respective frequencies, at least one of individually and in combinations of two or more;

for each of the one or more radio transmitters transmitting during the sequentially controlling, controlling the variable attenuator to a respective attenuation value where the monitoring radio receiver has a respective linear response for total power received at the receive antenna; and storing, at the memory, the respective attenuation value in association with an identifier identifying the one or more radio transmitters which were transmitting when the respective attenuation value was determined.

3. The system of claim 1, wherein the controller is further configured to: select the attenuation value based on a number of the one or more radio transmitters that are currently transmitting.

4. The system of claim 1, wherein the controller is further configured to: when two or more of the radio transmitters are currently transmitting, control the monitoring radio receiver to scan intermodulation frequencies associated with the currently active frequencies of the two or more of the radio transmitters that are currently transmitting.

5. The system of claim 1, wherein the controller is further configured to: when one or more unexpected frequencies are detected during the scan that are not the currently active frequencies, control the monitoring radio receiver to scan intermodulation frequencies associated with combinations of the one or more unexpected frequencies and the currently active frequencies.

6. The system of claim 1, wherein the controller is further configured to: when one or more unexpected frequencies are detected during the scan that are not the currently active frequencies, control the monitoring radio receiver to scan frequencies that, when combined with the currently active frequencies, causes one or more intermodulation frequencies at the one or more unexpected frequencies.

7. The system of claim 1, further comprising an analyzing controller configured to: analyze scans from the monitoring radio receiver to identify problems with the one or more radio transmitters.

8. The system of claim 7, wherein the analyzing controller is further configured to: analyze scans from the monitoring radio receiver to track behavior of the one or more radio transmitters as a function of time.

9. The system of claim 7, wherein the analyzing controller is further configured to one or more of: provide a report indicative of the problems; provide a report indicative of one or more of newly detected unexpected frequencies and newly detected unexpected transmitters; and initiate remedial action to address the problems.

10. The system of claim 1, wherein the monitoring radio receiver is combined with one of the one or more radio transmitters as a transceiver.

11. The system of claim 1, wherein the monitoring radio receiver is separate from the one or more radio transmitters.

12. A method comprising:

receiving, at a controller, from a radio-frequency site control computing device, identifiers of one or more radio transmitters which are currently transmitting, the one or more radio transmitters in communication with one or more transmit antennas located at a radio-frequency site, the one or more radio transmitters under control of the radio-frequency site control computing device, the controller in communication with the one or more radio transmitters, a monitoring radio receiver and a variable attenuator, the monitoring radio receiver in communication with a receive antenna through the variable attenuator, the controller in further communication with a memory storing respective pre-determined attenuation values for the variable attenuator in association with respective identifiers of the one or more radio transmitters which were transmitting when the respective attenuation values were determined, each of the respective pre-determined attenuation values for controlling the variable attenuator to a respective attenuation value where the monitoring radio receiver has a linear response for total power received at the receive antenna;

selecting, using the identifiers of the one or more radio transmitters which are currently transmitting, an attenuation value from the memory which corresponds to the one or more radio transmitters which are currently transmitting;

responsively controlling, at the controller, the variable attenuator to the attenuation value where a dynamic range of the monitoring radio receiver has a linear response for the total power received at the receive antenna; and, thereafter, controlling, at the controller, the monitoring radio receiver to scan at least currently active frequencies of the one or more radio transmitters.

13. The method of claim 12, further comprising calibrating the variable attenuator by:

sequentially controlling, at the controller, via the radio-frequency site control computing device, the one or more radio transmitters to transmit, at one or more of a respective maximum power level and a given power level, at one or more given respective frequencies, at least one of individually and in combinations of two or more;

for each of the one or more radio transmitters transmitting during the sequentially controlling, controlling, at the controller, the variable attenuator to a respective attenuation value where the monitoring radio receiver has a respective linear response for total power received at the receive antenna; and storing, at the memory, using the controller, the respective attenuation value in association with an identifier identifying the one or more radio transmitters which were transmitting when the respective attenuation value was determined.

14. The method of claim 12, further comprising: selecting, at the controller, the attenuation value based on a number of the one or more radio transmitters that are currently transmitting.

15. The method of claim 12, further comprising: when two or more of the radio transmitters are currently transmitting, controlling, at the controller, the monitoring radio receiver to scan intermodulation frequencies associated with the currently active frequencies of the two or more of the radio transmitters that are currently transmitting.

16. The method of claim 12, further comprising: when one or more unexpected frequencies are detected during the scan that are not the currently active frequencies, controlling, at the controller, the monitoring radio receiver to one or more of: scan intermodulation frequencies associated with combinations of the one or more unexpected frequencies and the currently active frequencies; and scan frequencies that, when combined with the currently active frequencies, causes one or more intermodulation frequencies at the one or more unexpected frequencies.

17. The method of claim 12, further comprising one or more of:

analyzing, at an analyzing controller, scans from the monitoring radio receiver to identify problems with the one or more radio transmitters;

analyzing, at the analyzing controller, the scans from the monitoring radio receiver to track behavior of the one or more radio transmitters as a function of time;

providing, at the analyzing controller, a report indicative of the problems;

providing, at the analyzing controller, a report indicative of one or more of newly detected unexpected frequencies and newly detected unexpected transmitters; and initiating, at the analyzing controller, a remedial action to address the problems.

\* \* \* \* \*